(12) United States Patent
Nabi et al.

(10) Patent No.: US 11,788,755 B2
(45) Date of Patent: Oct. 17, 2023

(54) SYSTEM AND METHOD FOR PERSONALIZED THERMAL COMFORT CONTROL

(71) Applicant: Mitsubishi Electric Research Laboraties, Inc., Cambridge, MA (US)

(72) Inventors: Saleh Nabi, Arlington, MA (US); Emil Laftchiev, Cambridge, MA (US); Piyush Grover, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 28 days.

(21) Appl. No.: 16/592,921

(22) Filed: Oct. 4, 2019

(65) Prior Publication Data

US 2021/0102722 A1 Apr. 8, 2021

(51) Int. Cl.
*F24F 11/46* (2018.01)
*F24F 11/56* (2018.01)
(Continued)

(52) U.S. Cl.
CPC ............. *F24F 11/46* (2018.01); *F24F 11/56* (2018.01); *F24F 11/65* (2018.01); *F24F 11/79* (2018.01); *F24F 11/80* (2018.01); *G05B 13/042* (2013.01); *F24F 2110/10* (2018.01); *F24F 2110/30* (2018.01); *F24F 2120/14* (2018.01);
(Continued)

(58) Field of Classification Search
CPC .. F24F 11/46; F24F 11/79; F24F 11/56; F24F 11/80; F24F 11/65; F24F 2110/30; F24F 2120/20; F24F 2120/14; F24F 2140/60; F24F 2110/10; F24F 2221/38; G05B 13/042

See application file for complete search history.

(56) References Cited

U.S. PATENT DOCUMENTS

2005/0280384 A1* 12/2005 Sulfstede ............. F04D 27/004
  318/432
2008/0300835 A1* 12/2008 Hixon ..................... G06F 30/23
  703/2
(Continued)

OTHER PUBLICATIONS

Saleh Nabi et al., Adjoint-based optimization of displacement ventilation flow, Jul. 2017, Building and Environment (Year: 2017).*

*Primary Examiner* — Kenneth M Lo
*Assistant Examiner* — Tameem D Siddiquee
(74) *Attorney, Agent, or Firm* — Gennadiy Vinokur; Hironori Tsukamoto

(57) ABSTRACT

A control system for controlling a heating ventilation and air conditioning (HVAC) system, uses a thermal comfort model (TCM), an airflow dynamics model (ADM) and an HVAC model connecting thermal states at air vents with states of actuators of the HVAC system, for determining a target thermal state at the air vents connecting the HVAC system to an environment, such that the target thermal state at the air vents results in a thermal state at the location of an occupant according to the ADM connecting uneven distribution of thermal states at different locations in the environment. Further, the control system determines and submits control commands to one or multiple actuators of the HVAC system producing the target thermal state at the air vents.

16 Claims, 15 Drawing Sheets

(51) Int. Cl.
    *F24F 11/65* (2018.01)
    *F24F 11/80* (2018.01)
    *F24F 11/79* (2018.01)
    *G05B 13/04* (2006.01)
    *F24F 140/60* (2018.01)
    *F24F 120/20* (2018.01)
    *F24F 110/30* (2018.01)
    *F24F 120/14* (2018.01)
    *F24F 110/10* (2018.01)

(52) U.S. Cl.
    CPC ....... *F24F 2120/20* (2018.01); *F24F 2140/60* (2018.01); *F24F 2221/38* (2013.01)

(56) References Cited

U.S. PATENT DOCUMENTS

| | | | | |
|---|---|---|---|---|
| 2009/0302124 | A1* | 12/2009 | Dawson | F24F 11/62 236/49.3 |
| 2014/0337256 | A1* | 11/2014 | Varadi | G05B 13/04 706/12 |
| 2015/0142393 | A1* | 5/2015 | van den Berghe | G06F 30/20 703/1 |
| 2015/0369507 | A1* | 12/2015 | Flaherty | F24F 11/30 236/1 B |
| 2016/0258645 | A1* | 9/2016 | Boufounos | F24F 11/30 |
| 2018/0100662 | A1* | 4/2018 | Farahmand | G05B 19/0428 |
| 2021/0011443 | A1* | 1/2021 | McNamara | G05B 19/042 |

\* cited by examiner

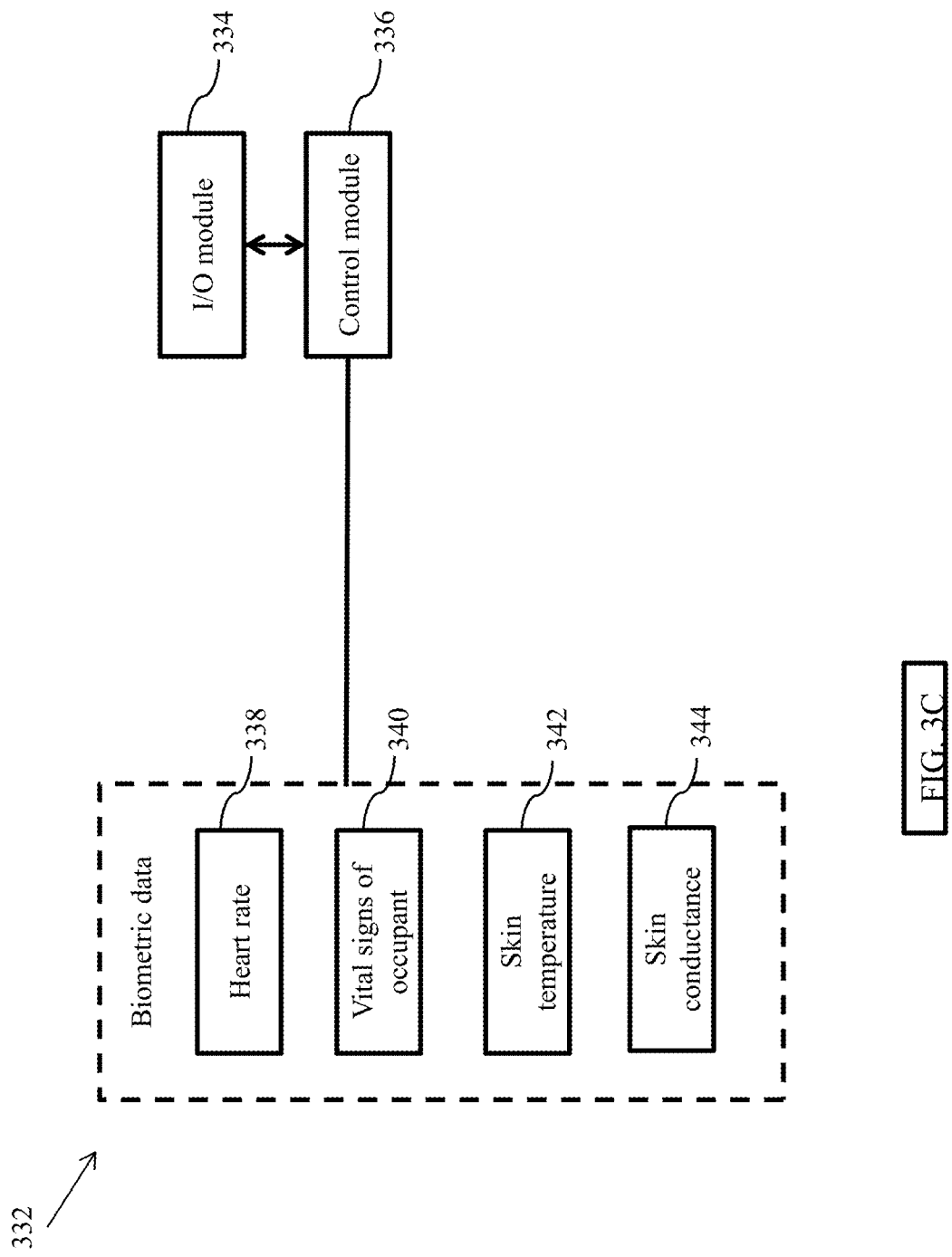

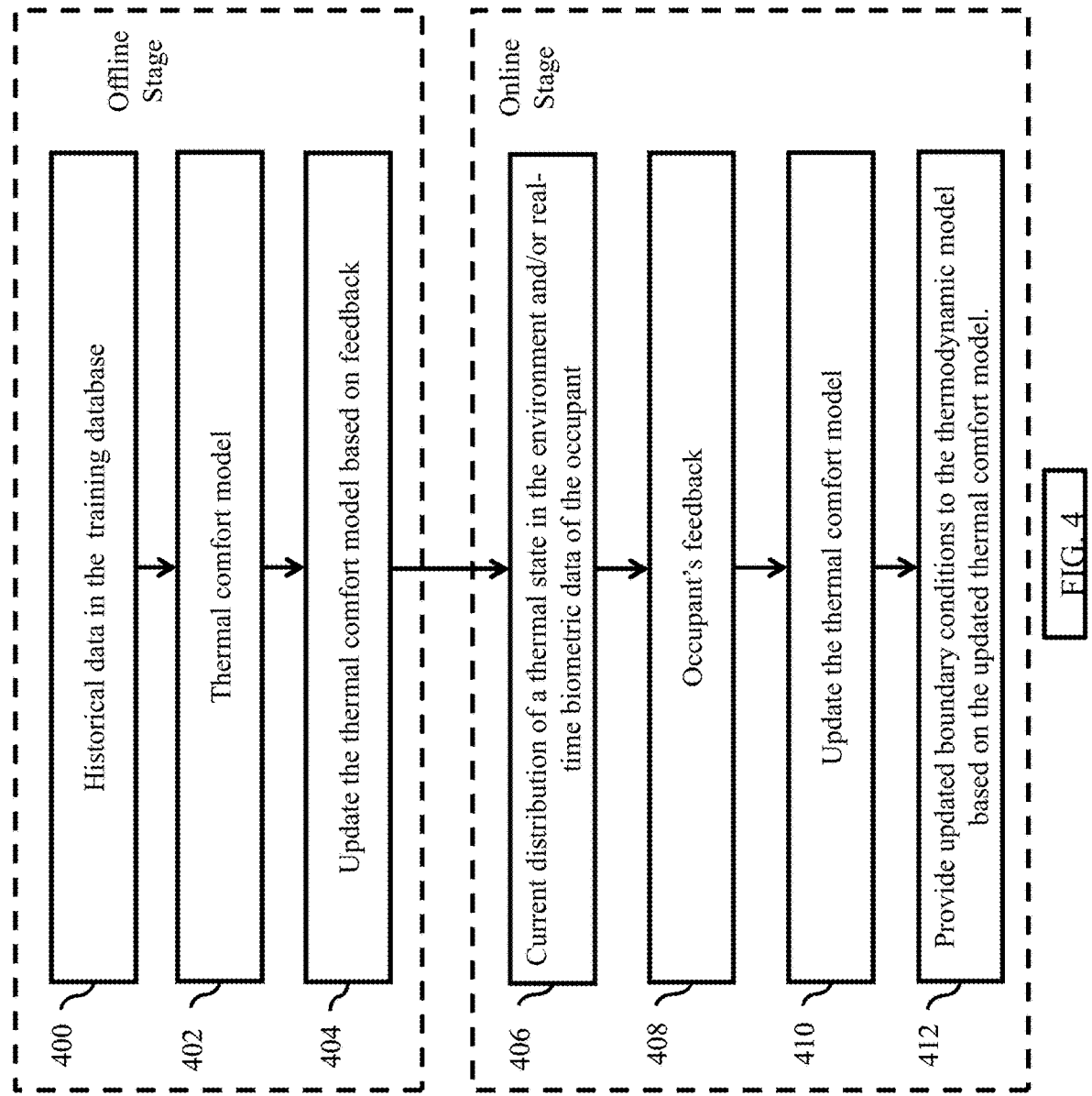

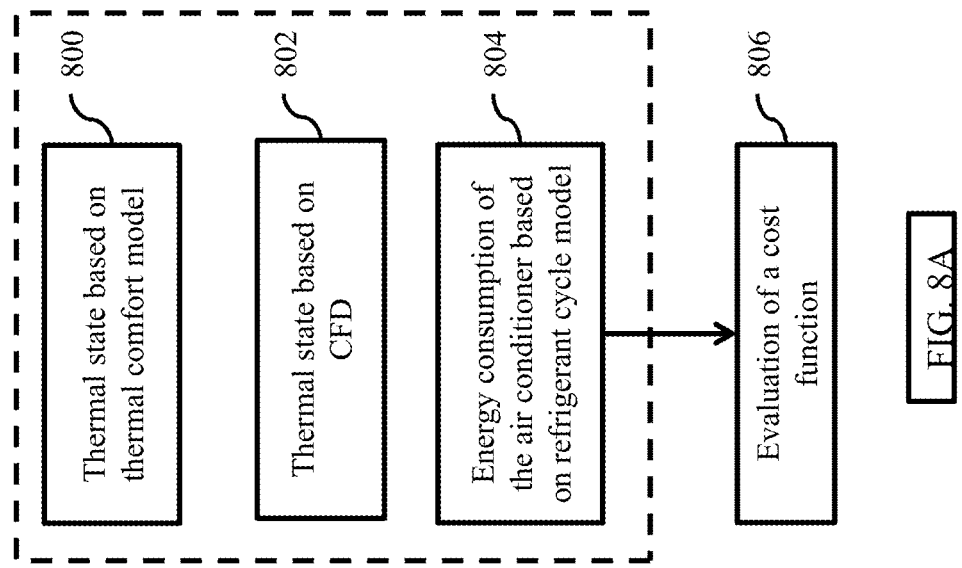

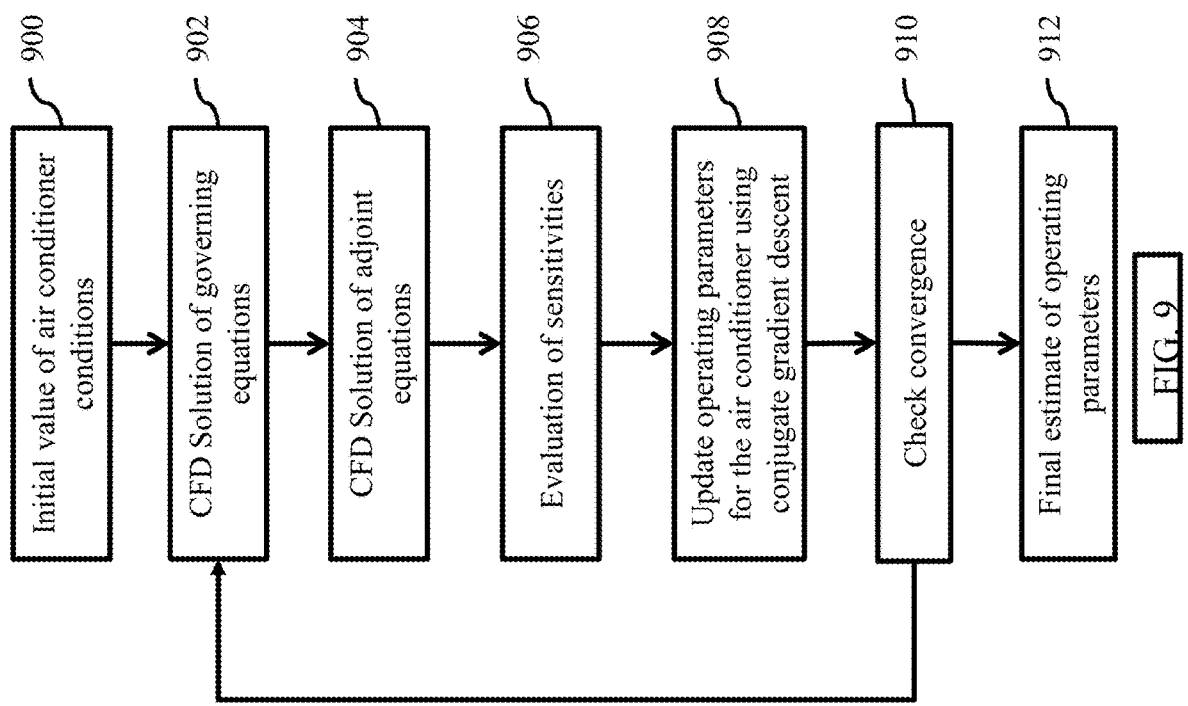

SYSTEM AND METHOD FOR PERSONALIZED THERMAL COMFORT CONTROL

TECHNICAL FIELD

This invention relates generally to control of thermal comfort in an environment and more particularly to controlling heating, ventilation, and air-conditioning (HVAC) systems based on a target thermal comfort of occupant(s) in an environment.

BACKGROUND

Thermal comfort may be considered as a condition of mind that expresses satisfaction with a thermal environment and is assessed by subjective evaluation. The thermal comfort significantly impacts a person's productivity and general well-being. Currently, thermal conditioning systems that include heat pumps, refrigeration and/or air-conditioning systems achieve the thermal comfort based on a wall thermostat or a remote control device, whose purpose is to turn the system on or off and modulate the system functioning such that temperature set-points are maintained. The temperature set-points indicate a desired level of thermal comfort based on the needs and thermal condition of occupants in a building. However, such a method of achieving the thermal comfort by the thermal conditioning systems often provide sub-optimal thermal comfort in an energy inefficient manner, and poor control in terms of the thermal comfort of the occupants for several reasons.

The main factors that influence the thermal comfort are those which determine heat gain and loss, mainly metabolic rate, clothing insulation, air temperature, air speed and relative humidity. Psychological parameters such as individual expectations also affect thermal comfort. Therefore, the occupants of the building rarely know optimal value of the set point that would maximize their thermal comfort.

Oftentimes, one or more occupants of a plurality of occupants within a space may feel too hot or too cold, regardless of whether other occupants may be comfortable. This phenomenon is based on the personal temperature preferences of the occupants, in combination with, for instance, activities that the individuals are currently or recently engaged with. For example, when an office worker has been sitting still at a desk for a long period of time on a cold winter day, the worker is likely to feel cold due to a lower metabolic rate, and request more heating by increasing the temperature set-point. Similarly, when a manual laborer has been performing vigorous physical work on a hot and humid summer day, the worker is likely to feel very hot, and can request more cooling by lowering the temperature set-point.

Age and physical condition of the individual may also play a factor in thermal comfort at a given temperature. For instance, temperature which may feel comfortable for a young person in a healthy state may seem too hot for a fat person or a person with one or more ailments. Similarly, a comfortable temperature for a younger individual may be too cool for an older individual. In addition, even at an individual level, reaction to temperature can differ for a variety of reasons. For instance, a temperature which is considered hot in the summer by an individual, may cause the same individual to feel cold in the winter. Thermal comfort, or temperature perception, may thus vary from individual to individual, and universally comfortable climate conditions may be difficult to achieve within a space. The optimal value fluctuates depending on the current conditions described above. Consequently, an occupant may set inefficient and inaccurate set-points. In such a manner, the occupants can overestimate or underestimate their need for thermal comfort, which can lead to dissatisfaction and the inefficient use of thermal conditioning systems.

One of the solutions to the stated problem is to eliminate the human intervention in operating the thermal conditioning systems and transfer the operating and controlling of the thermal conditioning systems to an intelligent system that can determine instantaneous thermal comfort and long-term comfort trends. As a result of this, unnecessary variable of set point from the occupant side of operating the thermal conditioning systems is eliminated.

To achieve the intelligent system, for example, some methods aim to develop thermal comfort models that are used to automatically sense and control the thermal comfort of the occupants. Learning process of the thermal comfort models of the occupants can be a tedious process with addition of uncertainty. However, as this process relies on trial-and-error of the occupant over many years and is subjected to constraints, it can be even more tedious and uncertain to find a mapping between the desired thermal comfort of the occupants and temperature set-points for the thermal conditioning systems such as HVAC systems. To that end, a number of methods and systems for controlling the HVAC systems to achieve desired thermal comfort have been carried out without using the thermal comfort model.

For example, some systems use smart thermostats which aim to learn the pattern of temperature set-points previously input by the occupant. Improved models of these thermostats are further directed to learn insulation models of the home to predict when there may be a deviation from the previously learned pattern of set points. These systems determine the set-points from past actions/inputs of the users rather than from their thermal comfort. Further, some systems, for example, utilize Nest Learning Thermostat (or Nest Thermostat) which is a smart thermostat designed to learn a set-points model that optimizes heating and cooling of homes and businesses to conserve energy. The Nest Thermostat is based on a machine learning algorithm: For the first week, user i.e. occupant need to regulate the thermostat in order to provide reference data set of temperature set-points. The thermostat can then learn occupant's schedule which is comprised of the set points used by occupant of the home and associated time stamps. Further, the thermostat yields energy savings by using built-in sensors and occupant's phone's locations (geo-fencing), so that it can shift into energy saving mode when it realizes that the occupant is away from the home.

However, such smart thermostats are based on an assumption that the occupant knows a priori the temperature set-points needed to achieve the occupant's thermal comfort. In other words, smart thermostats are based on an assumption that occupants can find out the mapping in an abstract way manually between their desired thermal comfort and the temperature set-points. But, this assumption is overly optimistic and incorrect. Consequently, this yields undesired thermal comfort for occupants.

Accordingly, there is a need to develop systems and methods to improve the thermal comfort of occupants that can address the problem of the mapping between the desired thermal comfort of the occupants and the temperature set-points for the HVAC system in a dynamic fashion.

SUMMARY

It is an object of some embodiments to provide a system and a method for controlling heating, ventilating, and air-conditioning (HVAC) systems based on a target thermal comfort desired by occupant(s) in a building. It is another object of some embodiments to provide such a system and a method that does not need to rely on a mapping between the target thermal comfort of the occupants and temperature set-points for the HVAC system.

Some embodiments are based on recognition that many HVAC systems control only a set-point air temperature as a surrogate for thermal comfort of an occupant or set of occupants in a building space. However, the air temperature set-point is a poor representation of the thermal comfort of the occupants both because of the lack of mapping between thermal comfort and set point in such a simplification, and because there is an implicit assumption of uniformity of the air temperature in the room, while the distribution of temperature and velocity in the built environment is nontrivially stratified and non-uniform in most times. Thermal comfort is the condition of mind that expresses satisfaction with the thermal environment. Most people feel comfortable at space air temperature, colloquially a range of temperatures around 20 to 22° C. (68 to 72° F.), but this range may vary greatly between individuals and depending on factors such as activity level, clothing, humidity, and culture.

A principle problem with choosing a set point is that thermal comfort is achieved when an individual/occupant is in thermal equilibrium with its surroundings. However, the set-point temperature is determined for a sensor that maybe located at a distance from the individual/occupant. Hence implicitly, or explicitly, the occupant is assuming that the temperature of the room at the sensor and at the occupant's own location is the same. This is called the uniformity assumption, and it may be impractical or at least tedious for the occupant to determine this mapping.

In addition, the thermal comfort of a given occupant or set of occupants in a building space depends on several factors such as the temperature and humidity of the air, the temperature of solid materials within the indoor environment, the velocity of the air, and the metabolic rate and amount of clothing worn by the occupant(s). Two general categories of factors affect the thermal interactions of an individual with its environment: factors internal to the occupant, such as metabolic rate, clothing insulation, and psychological parameters, and factors external to the occupant(s), which include building space air temperature, mean radiant temperature, air speed, and air relative humidity.

As these variables are difficult to measure directly, most HVAC systems do not attempt to regulate the thermal comfort of the occupants in a building space. Because the vast majority of HVAC systems are effective at regulating only one of the many variables that influence thermal comfort, it is conventional for HVAC systems regulate a single variable, set-point, and assume that this one variable is an adequate surrogate for thermal comfort. For example, many vapor-compression heat pumps and air-conditioning systems directly regulate only the building space air temperature because it is easy and inexpensive to measure. Unfortunately, however, such measurement is often ineffective in achieving the thermal comfort of the occupants in an energy efficient manner. For example, a common scenario in a heating application is that occupant sets the building space air temperature set-point to be several degrees higher than what is actually needed to achieve thermal comfort. This occurs for two reasons: first, a heat pump aims to achieve an average temperature in the building space, and second, this temperature is achieved over some predefined "acceptable" time horizon. In practice neither assumption may fit the occupant. In particular, the occupant may not be observing the hypothesized average temperature as his/her location, and the occupant may like to achieve the temperature sooner. In effect, it could be that the occupant would actually be comfortable at a lower air temperature at his/her location when the desired temperature is delivered faster. Such examples clarify the importance of models that do not assume well-mixed temperature or velocity distribution in the room.

To that end, some embodiments are based on realization that the target thermal state at the location of the occupant is a better representation of personalized thermal comfort of the occupant than a temperature set-point at a different location of a thermostat of the HVAC system. Additionally, or alternatively, some embodiments are based on realization that the target thermal state can include only a temperature at the location of the occupant, but can also include other factors influencing thermal comfort of the occupant, such as velocity of airflow and/or humidity in the conditioned environment. As used herein, a target thermal state at a specific location is an absolute or relative change in one or combination of temperature, airflow velocity, and humidity at the specific location or a region including the location.

Additionally, or alternatively, some embodiments are based on a realization that by considering airflow dynamics in the conditioned environment, the HVAC system can be controlled to change a current thermal state at a location of the occupant to a target thermal state without the need to determine a temperature set-point at any other location. Additionally, or alternatively, some embodiments are based on realization that HVAC system can be controlled to provide uneven distribution of the thermal states in the conditioned environment subject to constraints on target thermal state at the location of the occupant to reduce energy consumption of the HVAC system while satisfying thermal comfort of the occupant. Additionally, or alternatively, some embodiments are based on a realization that the target thermal state of the occupant can be determined using a thermal model that can map a target thermal comfort of the occupants to the target thermal states at their locations. In such a manner, the target thermal state at the locations of the occupants can be determined without determining a set point for an average temperature in the environment. In effect, such a determination can achieve the thermal comfort of the occupant(s) without providing a mapping between occupant's thermal comfort and temperature set-points.

Accordingly, one embodiment discloses a control system for controlling a heating ventilation and air conditioning (HVAC) system to condition an environment. The system includes an input interface configured to accept an input thermal state at a location of an occupant in the environment and data indicative of the current thermal comfort of the occupant; a memory configured to store a thermal comfort model (TCM) connecting a current thermal state at the location of the occupant with the input thermal state at the location of the occupant changing a current thermal comfort of the occupant to a desired thermal comfort, an air flow dynamics model (ADM) and an HVAC model connecting thermal states at the air vents with states of the actuators of the HVAC system; and a processor configured to determine a target thermal state at one or multiple air vents connecting the HVAC system to the environment, such that the target thermal state at the air vents results in the input thermal state at the location of the occupant according to an airflow dynamics model (ADM) connecting uneven distribution of thermal states at different locations in the environment; and determine control commands to one or multiple actuators of the HVAC system producing the target thermal state at the air vents; and a control interface configured to submit the control commands to the actuators of the HVAC system. The thermal comfort model allows determining target thermal state at the location of the occupant, which in turn allows the processor to determine (possibly uneven) distribution of values of thermal states for different locations in the environment, such that there is the target thermal state at the location of the occupant. In effect, such determinations allow avoiding determining a set point for an average temperature in the environment because instead of making a broad generalization, this approach allows for precise determination of the required thermal environment at the occupant's location. This in turn allows increasing thermal comfort of an occupant, while reducing energy consumption of HVAC system.

For example, in one embodiment, the thermal state at each location in the environment includes a temperature vector and an airflow velocity vector, such that the target thermal state includes distributions of the temperature field and distributions of the airflow field. In another embodiment, the thermal state at each location in the environment also includes a humidity vector, such that the target thermal state includes also the distribution of the humidity field. These embodiments are based on recognition of multiple factors influencing thermal comfort of an occupant to increase accuracy of thermal comfort determination.

In some embodiments, the target thermal state at the air vents is determined based on computational fluid dynamics (CFD) calculation of dynamics of air in the environment using the ADM as a constraint, and the input thermal state at the location of the occupant and the target thermal state at the air vents as boundary conditions on the distribution of thermal states in the environment. In an embodiment, the ADM represents the dynamics of the air in the environment using Navier-Stokes equation with heat transfer equations describing changes on physical properties of heat transfer and motion of the air, wherein the CFD calculation solves the Navier-Stokes equation with heat transfer equations to produce the target thermal state at the air vents resulting in the input thermal state at the location of the occupant.

Additionally, or alternatively, some embodiments determine the control commands by optimizing a cost function of an operation of the HVAC system subject to constraints on the input thermal state at the location of the occupant, constraints on dynamics of the HVAC system represented by an HVAC model, and constraints on dynamics of airflow in the environment represented by the ADM. The optimization of the cost function minimizes energy consumption of the HVAC system These embodiment allows to couple different dynamics of the HVAC system and dynamics of the airflow to ensure that the target thermal state can be achieved. In different implementations, the constraints can be used as soft constraints or as hard constraints. The soft constraints allow deviation from the target thermal state, which may be more practical for real-time thermal control.

Some embodiments determine current distribution of dynamics of airflow velocity, temperature, and humidity in the environment using the model of airflow dynamics. These embodiments can reduce a number of sensors for measuring the thermal state. For example, in one embodiment, environmental data include measurements of thermal state at specific locations, wherein the processor is configured to determine the current distribution of the thermal state in the environment by data-fitting assimilation of the measurements into dynamics of the airflow velocity, temperature, and humidity in the environment. Additionally or alternatively, in one embodiment the environmental data includes a model of the environment and distributions of variables of the model of the environment, wherein the model of the environment includes location of windows and location of doors and walls and the variables of the model of the environment may indicate whether the windows and the doors are open or closed, wherein the model of the environment includes a location and a type of a heat source, e.g., computer, oven, occupants, etc., in the environment and the variables of the model of the environment indicate a state of the heat source. This embodiment allows increasing accuracy of thermal state distribution determination.

Different embodiments use different kinds of personal data indicative of a current thermal comfort of the occupant to estimate the target thermal state. For example, in one embodiment, the personal data includes biometric measurements of vital signs of an occupant, wherein the processor is configured to determine the current thermal comfort of the occupant from the biometric measurements. The vital signs can be measured by a remote photoplethysmography (RPPG) sensor to conceal the measurements of biometrics in the user environment or by a wearable device for measuring the vital signs of the occupants in remote communication with the input interface of the control system.

Additionally, or alternatively, the personal data may include gestures of the occupant, and wherein the processor is configured to determine the current thermal comfort of the occupant from the gestures sensed, e.g., by an image capturing device such as a camera. Examples of gestures include shivering of an occupant indicating that the occupant is cold or imitation of fan blowing actions indicating that the occupant is hot. Additionally, or alternatively, the personal data may include labels of the current thermal comfort provided by the occupant, e.g., "too hot" or "too cold." Notably, the target thermal state for an occupant can be represent in absolute or relative values of the temperature, velocity of airflow and/or humidity.

Some embodiments implement two-way interaction between the thermal model and the HVAC system for not only controlling the HVAC system, but also for updating the thermal model. For example, one embodiment updates the thermal comfort model based on the updated distribution of the thermal state in the environment and the target thermal state at the location of the occupant. In this embodiment, the dynamics of the airflow used to determine the current distribution allows to reduce in the number of sensors measuring the current thermal comfort of the occupant.

Definitions

In describing embodiments of the invention, the following definitions are applicable throughout (including above).

A "vapor compression system" may refer to a system that uses the vapor compression cycle to move refrigerant through components of the system based on principles of thermodynamics, fluid mechanics, and/or heat transfer. The vapor compression systems may include, but not limited to, a heat pump, refrigeration, and an air-conditioner system. Vapor compression systems are used in applications beyond the conditioning of residential or commercial spaces. For example, vapor compression cycles can be used to cool computer chips in high-performance computing applications.

A "radiant system" may refer to a system that supplies heat directly to the building materials such as the concrete floor, and heats the space and occupants mainly through radiant heat transfer. The radiant system uses a medium of heat transfer such as hot or cold water that runs through pipes that are embedded in the building material, but could also use electrical heating wires or heat exchangers connected to a vapor compression machine.

An "HVAC" system may refer to any building heating, ventilating, and air-conditioning (HVAC) system implementing the vapor compression cycle. HVAC systems span a broad set of systems, ranging from systems which supply only outdoor air to the occupants of a building, to systems which only control the temperature of a building, to systems which control the temperature and humidity.

"Components of a vapor compression system" may refer to any components of the vapor compression system having an operation controllable by the control systems. The components include, but are not limited to, a compressor having a variable speed for compressing and pumping the refrigerant through the system; an expansion valve for providing a pressure drop between the high-pressure and the low-pressure portions of the system, and an evaporating heat exchanger and a condensing heat exchanger.

An "evaporator" may refer to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor compression system.

A "condenser" may refer to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor compression system.

An "air vent" may refer to an edge point of a system of passages used in heating, ventilation, and air conditioning (HVAC) to deliver and remove air from the conditioned environment. The needed airflows include, for example, supply air, return air, and exhaust air. As such, air vent are used for ensuring acceptable indoor air quality as well as thermal comfort. The thermal state at the air vent may include one or combination of temperature, velocity and humidity of the air outputted by the HVAC system to the environment.

An "electrical circuit" may refer to a closed path that interconnects electrical signals among components, such as processors, memory, or actuators.

A "set-point" may refer to a desired value of a variable, such as the building space temperature. The term set-point is applied to any particular value of a specific set of variables.

A "computer" may refer to any apparatus that is capable of accepting a structured input, processing the structured input according to prescribed rules, and producing results of the processing as output. Examples of a computer include a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" may refer to a computer or a component of a computer that reads and executes software instructions.

A "memory" or a "computer-readable medium" may refer to any storage for storing data accessible by a computer. Examples include a magnetic hard disk, a floppy disk, an optical disk, like a CD-ROM or a DVD; a magnetic tape, a memory chip, and a carrier wave used to carry computer-readable electronic data, such as those used in transmitting and receiving e-mail or in accessing a network, and a computer memory, e.g., random-access memory (RAM).

"Software" may refer to prescribed rules to operate a computer. Examples of software include software, code segments, instructions, computer programs, and programmed logic. Software of intelligent systems may be capable of self-learning.

A "module" or a "unit" may refer to a basic component in a computer that performs a task or part of a task. It may be implemented by one or both of software and hardware.

A "controller," "control system," and/or "regulator" may refer to a device or a set of devices to manage, command, direct or regulate the behavior of other devices or systems. The controller may be implemented by hardware, a processor with operation configured by the software, and combination thereof. The controller may be an embedded system.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 3C shows various components of a biometric data sensing unit for acquiring biometric data, according to some embodiments.

FIG. 4 shows a schematic of a learning process of thermal comfort model, according to some embodiments.

FIG. 8A shows a schematic of constructing and evaluating a cost function that includes both thermal comfort of the occupant and energy consumption of the HVAC equipment, according to some embodiments.

FIG. 9 shows a block diagram as an example optimization method to implement the optimal air conditioner input in terms of the thermal comfort of the occupant with minimum energy, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example" "for instance" and "such as", and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

System Overview

Figure 1A:
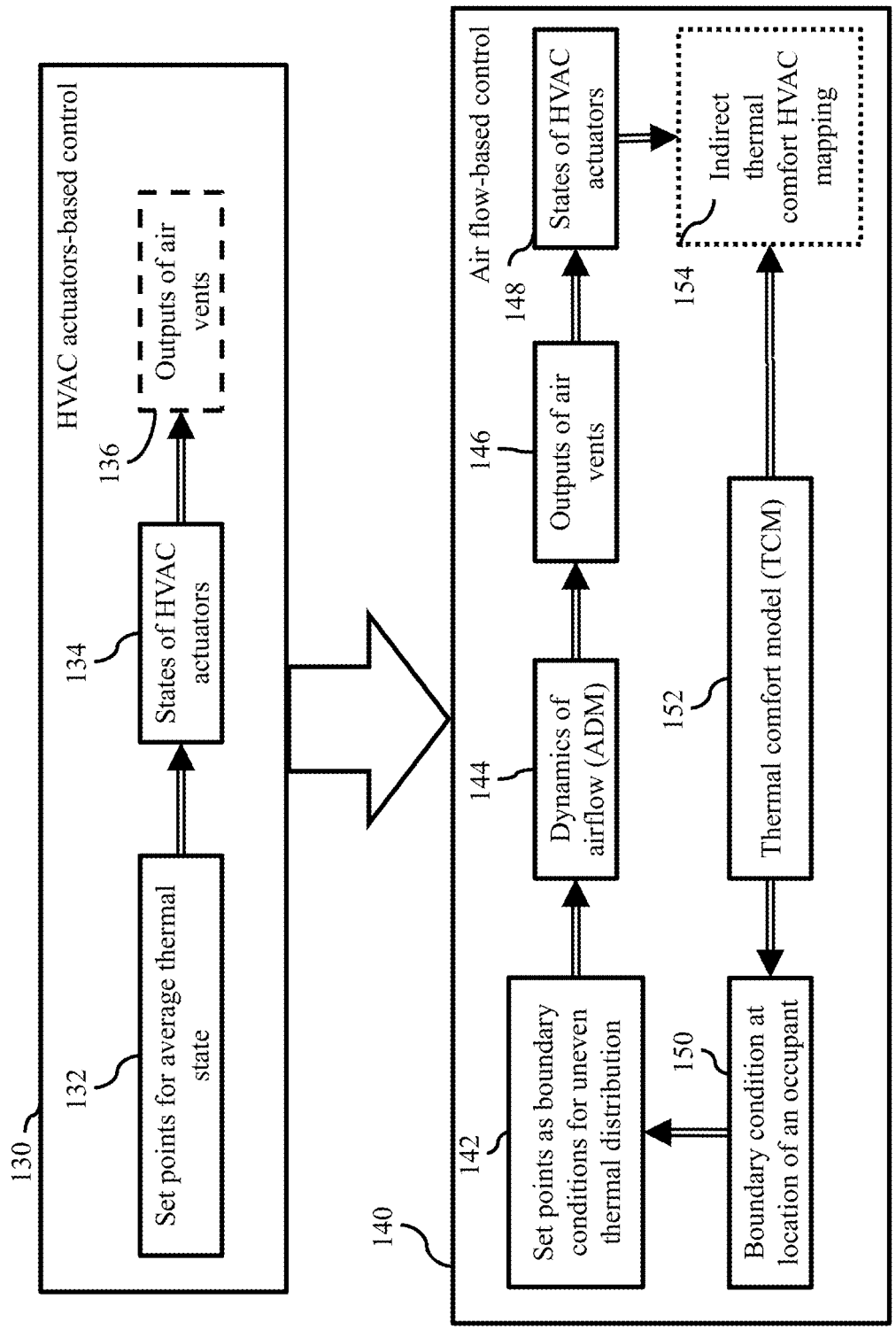
FIG. 1A shows a schematic of principles of heating ventilation and air conditioning (HVAC) control transformation used by some embodiments.

FIG. 1A shows a schematic of principles of heating ventilation and air conditioning (HVAC) control transformation used by some embodiments. The embodiments are based on recognition that the objective of HVAC control is change state of actuators of the HVAC system to ensure thermal comfort of the occupants of a conditioned environment. Examples of the states of the actuators include the speed of the compressor of the HVAC, positions of various valve, rotation position of air louvers directing the exhaust air, etc. Indeed, the air is conditioned based on the state of those actuators controlling the vapor compression cycle. To that end, the HVAC actuators based control 130 aims to determine the states of HVAC actuators 134 to meet set points 132 desired by the occupants of the environment.

The HVAC actuators based control 130 determines the state of actuators 134 to meet the set points 132. For example, these set points are values set by a thermostat located at a wall of the conditioned environment, which is different from the location of the occupant of the environment. However, the states of the HVAC actuators are determined under assumption of the average distribution of the thermal state in the environment, e.g., the temperature at the thermostat and the temperature at the location of the user somewhere in the environment are the same. Therefore, the set points 132 may be referred to as setpoints for average thermal state.

In the HVAC actuators based control 130, the state of HVAC actuators is the primary objective of control, while the state of outputted air 136 is secondary one and sometimes treated as a bypass product. The output from air vents 136 includes one or combination of temperature, velocity and humidity of the air outputted by the HVAC system to the environment. Indeed, if the states of HVAC actuators are determined, the output from air vents would follow. Because the output from air vents are controlled by changing the state of the actuators, the output from air vents 136 may not be directly determined.

Some embodiments reverse this framework in air flow based control 140 by making the output from air vents of the HVAC system primary objective of control. The air flow based control 140 first tries to determine the outputs of air vents 146 resulting in reaching the desired set points and then determines the state of HVAC actuators that results in the determined outputs of the air vents. That is, the states of actuators are determined for outputs of HVAC system from its air vents, and not for the set points at some points at the wall of the conditioned environment.

Such a transformation simplifies internal control HVAC actuators, but also allows to move the significant portion of the HVAC control from domain of dynamics of HVAC actuator to the domain of air flow dynamics. That transformation in turn allows relaxing the constraint on average temperature in the room. Hence, some embodiments use the set points 142 as boundary conditions for evaluating dynamics of the airflow 144 in the conditioned environment to estimate the outputs of the air vents 146 resulting in the desired set points with uneven thermal distribution in the environment. Next, the determined outputs of the air vents are used to produce the states of HVAC actuators 148 resulting in the determined outputs. The states of the HVAC actuators can be estimated using various kind of models of HVAC dynamics ranging from PID control policy minimizing error between current outputs and estimated outputs 146 and other model capturing the dynamics of HVAC system with partial or ordinary differential equations.

Some embodiments are based on recognition that because in the air flow based control 140 of HVAC system the requirement for average thermal distribution in the environment is relaxed, there is no need to provide set point for some point at the wall. Indeed, the set point can be provided for location of the occupant. In this situation, the boundary condition for air flow dynamics estimation is located not at the boundary of the environment, but somewhere within the environment. However, such a complication can be handled by air flow model.

Hence, some embodiments use the desired thermal state at location of an occupant as an input boundary condition 150 to estimate the outputs of air vents 146. For example, an occupant can specify the desired temperature, airflow and/or humidity, and the air flow based control would produce this thermal state at the location of the occupant while other location may have different values of the thermal state. In such a manner, the problem of thermal uniformity assumption can be overcome.

Additionally, or alternatively, some embodiments are based on recognition that thermal comfort is the condition of mind and it can be burdensome for occupants to estimate the desired thermal state that would achieve their comfort. To that end, some embodiments use a thermal comfort model (TCM) 152 configured to estimate input thermal state 152 based on current thermal comfort of an occupant. The TCM 152 is trained in advance. In some embodiments, the current thermal comfort of occupants is determined based on their biometrics.

In combination, their air flow based control 140 uses dynamics of air flow to estimate uneven distribution of thermal states with desired thermal state at location of an occupant produced by the TCM to determine the outputs of air vents and corresponding states of HVAC actuators resulting in such an uneven distribution to provide an indirect mapping 154 between occupant's thermal comfort and operation of HVAC system without a need to specify external set point values.

Figure 1B:
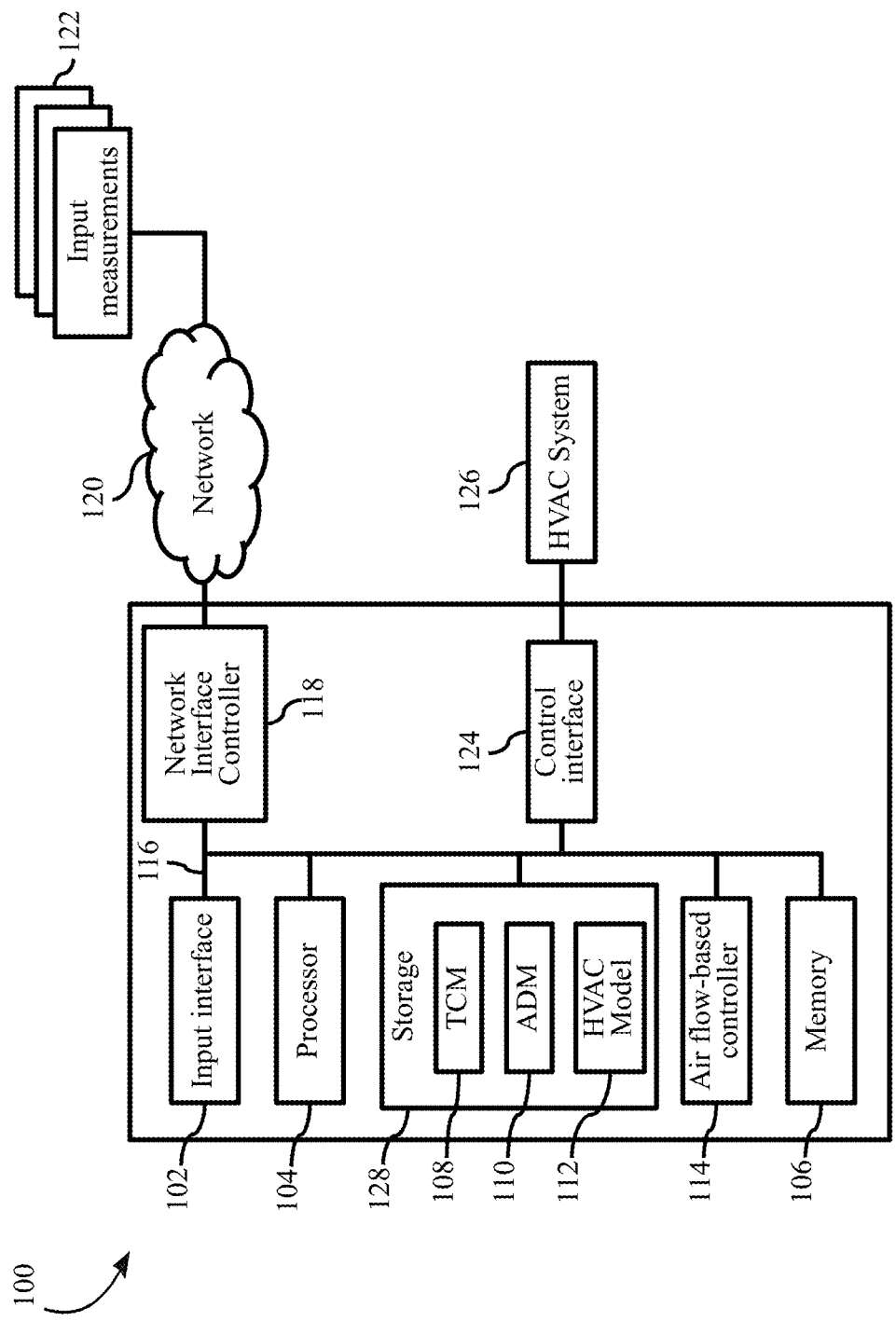
FIG. 1B shows a block diagram of a control system for controlling a heating ventilation and air conditioning (HVAC) system to condition an environment, according to some embodiments.

FIG. 1B shows a block diagram of a control system 100 for controlling a heating ventilation and air conditioning (HVAC) system 126 to condition the environment, according to some embodiments. The control system 100 may be used for controlling a heating ventilation and air conditioning (HVAC) system to condition the environment. The environment may be a room or space of a building, or the whole building where the HVAC system is installed. In some embodiments, the environment may correspond to space of the building where occupants are located or reside. In some embodiments, environment may include interior space of a train, car or an aerospace vehicle. In some embodiments, the control system 100 may optimize output parameters of the HVAC system. The output parameters of the HVAC system includes air vents locations, inlet temperature, inlet velocity, inlet humidity and/or individual vane angle. In some embodiments, the control system 100 may monitor the environment by taking various input measurements 122. The input measurements 122 are measurements from one or more sensors that are located in the environment. According to some embodiments, the one or more sensors may be temperature sensors, air velocity sensors and/or humidity sensors for acquiring thermal condition of the environment and subsequently monitoring the environment.

The control system 100 may include an input interface 102 and a control interface 124 for connecting the control system 100 with other systems and devices. In some embodiments, the control system 100 may include a plurality of input interfaces and a plurality of output interfaces. The input interface 102 may include a network interface controller (NIC) 118 adapted to connect the system 100 through a bus 116 to a network 120. Through the network 120, either wirelessly or through wires, the control system 100 may receive the input measurements 122.

The input interface 102 may be configured to accept location data, environmental data and/or personal data. The location data is indicative of a location of an occupant in the environment. The location may be a region where the occupant is situated in the environment. In some embodiments, the environment may be defined by or as a three-dimensional space (3D) space and locations in the environment are given in a 3D coordinate system. In such cases, the location is a point in the environment representing location of a part of the occupant, such as but not limited to wrist, face or hand of an occupant. The location of the occupant in the environment may be determined by one or more indoor positioning systems that are based on distance measurement to nearby anchor nodes (nodes with known fixed positions, e.g. Wi-Fi access points or Bluetooth beacons), magnetic positioning, grid concepts, or dead reckoning. The environmental data is indicative of a current distribution of a thermal state in the environment. The thermal state may be obtained for each of locations in the environment. In some embodiments, the locations may be predetermined. In some embodiments, the locations are determined in real-time. In one embodiment, the thermal state in the environment may correspond to temperature at each location of the environment. In some embodiments, the thermal state includes a temperature vector, airflow velocity vector such that a target thermal state at the location of the occupant includes distributions of temperature field and distributions of airflow field. In some other embodiments, the thermal state at each location in the environment includes a humidity vector, such that the target thermal state includes distributions of humidity field. The personal data is indicative of a current thermal comfort of the occupant.

For example, in one embodiment, an input interface configured to accept an input thermal state at a location of an occupant in the environment. For example, the input thermal state is a thermal state desired to achieve thermal comfort of the occupant. The input thermal state can be determined externally to the control system 100, in this case, the input measurements 122 include the input thermal state. The input thermal state can be determined internally by the control system 100, in this case, the input measurements 122 include data indicative of the input thermal state, such as current thermal comfort of an occupant.

In different implementations, the thermal state can include different physical quantities. For example, the thermal state can include one or combination of temperature, velocity, and humidity of the air. Because thermal comfort is a state of mind, different combinations of values of the thermal state can be used to achieve the thermal comfort of an occupant.

The control system 100 includes a memory 106 that stores instructions that are executable by a processor 104. The processor 104 may be configured to execute the stored instruction. The processor 104 may be a single core processor, a multi-core processor, a computing cluster, or any number of other configurations. The memory 106 may include random access memory (RAM), read only memory (ROM), flash memory, or any other suitable memory systems. The processor 104 is connected through a bus 116 to one or more input and output devices.

In some embodiments, the processor executes the air flow based controller 114 to determine a target thermal state at one or multiple air vents connecting the HVAC system to the environment and to determine control commands to one or multiple actuators of the HVAC system producing the target thermal state at the air vents. The air flow based controller 114 uses an airflow dynamics model (ADM) 110 connecting uneven distribution of thermal states at different locations in the environment to produce the target thermal state at the air vents. Specifically, the target thermal state at the air vents results in the input thermal state at the location of the occupant according to the ADM. In addition, the processor can use a model of HVAC dynamics 112 to produce the state of the HVAC actuators resulting in the target thermal state at the air vents. The processor determines the control commands to the actuators to change their states to the determined states submit the control commands to the actuators of the HVAC system 126 via a control interface 124. As a result, the accuracy of determining achieving the input thermal state at the location of the occupant is improved.

In some implementations, the processor determines the target thermal state at the air vents based on computational fluid dynamics (CFD) calculation of dynamics of air in the environment using the ADM as a constraint, and the input thermal state at the location of the occupant and the target thermal state at the air vents as boundary conditions on the distribution of thermal states in the environment. In effect, the processor uses CFD simulation to find boundary condition at the air vents to correspond to the boundary condition at the location of the occupant according to the ADM. For example, in one embodiment, the ADM represents the dynamics of the air in the environment using Navier-Stokes equations describing changes on physical properties of heat transfer and motion of the air, wherein the CFD calculation solves the Navier-Stokes equations with heat transfer to produce the target thermal state at the air vents resulting in the input thermal state at the location of the occupant.

In various embodiments, the thermal state at each location in the environment includes a temperature vector and an airflow velocity vector, such that the distribution of values of thermal states at different locations in the environment includes distributions of the temperature field and distributions of the airflow field. In these embodiments the occupants can use their experience to provide their desired temperature and airflow at their locations. Additionally, or alternatively, in some embodiments, the thermal state at each location in the environment includes a temperature vector, an airflow velocity vector, and a humidity vector, such that the distribution of values of thermal states at different locations in the environment includes distributions of the temperature field, distributions of the airflow field, and distributions of the humidity field. These embodiments can help to improve a thermal comfort of the occupants, however, it can be difficult for some occupants to arrive on a combination of these values.

To that end, in some embodiments, the memory 106 is configured store a thermal comfort model (TCM) 108 connecting a current thermal state at the location of the occupant with the input thermal state at the location of the occupant changing a current thermal comfort of the occupant to a desired thermal comfort. In some embodiments, the target thermal state may correspond to desired temperature at the location of the occupant. In some other embodiments, the target thermal state may include desired temperature, airflow velocity and/or humidity at the location of the occupant. In some example embodiments, the thermal comfort model 108 is established offline i.e. in advance. Since the thermal comfort model is pertinent to an individual i.e. the occupant, it is also referred to as personalized thermal comfort model.

Hereinafter, the 'thermal comfort model' and the 'personalized thermal comfort model' may be used interchangeably and would mean the same. The thermal comfort model 108 may output a thermal comfort value of the occupant which indicates the occupant is feeling cold, hot, slightly hot or neutral. In some embodiments, the output of the thermal comfort model 108 may be utilized to define boundary conditions of an air flow dynamics model. In some embodiments, temperatures at the walls of the room/environment may be fed as boundary conditions to the air flow dynamics model.

In some embodiments, the control system 100 includes a storage device 128 configured to store thermal comfort model (TCM) 108, the ADM 110 and/or the HVAC model 112. The storage device 130 may be implemented using a hard drive, an optical drive, a thumb drive, an array of drives, or any combination thereof. The processor 104 is configured to estimate the current thermal state at the location of the occupant using the ADM 110 with boundary conditions determined by a current thermal state at the air vents and submit the current thermal state at the location of the occupant and the current thermal comfort of the occupant to the TCM 108 to produce the input thermal state at the location of the occupant. Next, the processor is configured to determine the target thermal state at the air vents resulting in the input thermal state at the location of the occupant according to the ADM 110 and determine the control commands updating the states of the actuators to result in the target thermal state at the air vents according to the HVAC model 112.

In such a manner, the current distribution of the thermal state is changed to the updated distribution of the thermal state without determining a set point for an average temperature in the environment. As the set point is excluded, the inaccuracy instigated in determining the control commands based on the set point is eliminated or reduced, thereby increasing the accuracy of the control commands for the HVAC system. Consequently, the input thermal state at the occupant location is achieved more accurately. Further, the updated distribution of the thermal state in the environment includes uneven distribution of values of thermal states for different locations in the environment.

In different implementations, the processor is configured to determine current thermal state at the air vent using the HVAC model with current states of the actuators of the HVAC system. In these implementations, the processor uses the models to avoid extra sensing. Also, some embodiments use a biometric sensor configured to determine the current thermal comfort of the occupant based on biometrics of the occupant. For example, the biometric sensor can include one or combination of a remote photoplethysmography (RPPG) sensor for measuring one or more vital signs of the occupant, a wearable device for measuring the one or more vital signs of the occupants, and a camera for determining gestures of the occupant indicative of the thermal comfort of the occupant.

The processor 104 is further configured to submit the control commands to actuators of the HVAC system 126. The control system 100 includes a control interface 124 to connect the system 100 to the HVAC system 126. In some embodiments, through the control interface 124, the control system 100 may be configured to control the HVAC system 126 based on the control commands.

Figure 2:
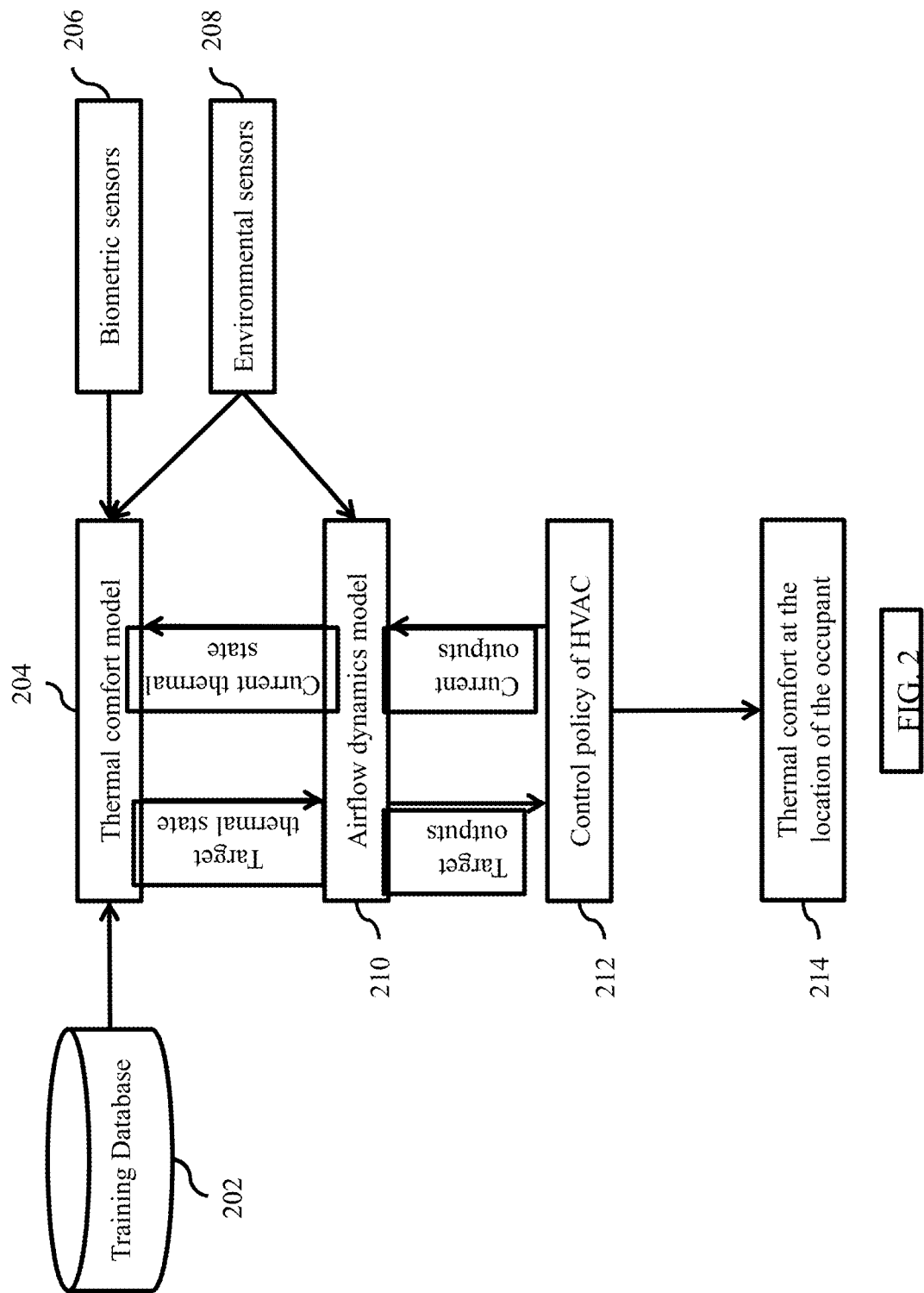
FIG. 2 shows a schematic overview of principles of controlling the HVAC system to condition the environment, according to some embodiments.

FIG. 2 shows a schematic overview of principles of controlling the HVAC system to condition the environment, according to some embodiments. It is an objective of some embodiments to determine control commands to the HVAC system 126 to achieve desired thermal comfort. Further, it is an objective of some embodiments to achieve the desired thermal comfort at the occupant location without determining the set point for the average temperature in the environment. A thermal comfort model (TCM) 204 is established by training it with a training database 202. The training database 202 is explained in detail with reference to the FIGS. 3A-3D. The training comfort model 204 is trained in offline stage. The offline stage is performed in advance, i.e., before the operation of the HVAC system begins. The online stage is performed in real time during the operation HVAC system.

The training comfort model 204 is a statistical model and estimates the thermal comfort value of the occupant based on the current distribution of the thermal state in the environment, the current thermal comfort of the occupant, and feedback provided by the occupant. In some embodiments, the thermal comfort value may be the target thermal state. Biometric sensors 206 provide the current thermal comfort of the occupant and environmental sensors 208 provide the current distribution of the thermal state in the environment. The thermal circuit model 204 estimates a thermal comfort value each time it receives the current thermal comfort of the occupant. The thermal state at the location of the occupant is used as boundary conditions by the ADM 210. The air flow dynamics model 210 may be a physical model describing dynamics of the airflow velocity, temperature, and humidity in the environment. The measurements from the environmental sensors 208 are fed to the airflow dynamics model 210. Subsequently, the air flow dynamics model 210 estimates thermal conditions, such as airflow velocity, temperature and humidity at each location in the environment. The estimated thermal conditions at the occupant location are fed to the thermal comfort model 204. Further, the thermal comfort model 204 may estimate accurate target thermal state and subsequently apply it to the airflow dynamics model 210.

The airflow dynamics model 210 provides mapping between the input thermal state at location of an occupant and target outputs of the air vents referred herein as target thermal state of the air vents. The target outputs include output parameters such as air vents locations, inlet temperature, inlet velocity, inlet humidity and/or individual vane angle of the HVAC system. Control policy of the HVAC system 212 provides control of internal parameters of the HVAC system, such as level of valve opening or closing, compressor pressure, and the like, based on the target outputs. Consequently, the thermal state at the location of the occupant is changed to the target thermal state and thermal comfort at the location of the occupant is achieved 214. The control policy can use the HVAC model, which can be as simple as PID model or as complex as physical model of HVAC dynamics.

In some embodiments, the output parameters are used as boundary conditions on computational fluid dynamics (CFD) calculation using ADM as constraint. In some embodiments, current output parameters of the HVAC system may be the boundary conditions of the air flow dynamics model 210. In some other embodiments, the output parameters at the walls of the room/environment are used as boundary conditions on the air flow dynamics model 210. Since the airflow dynamics model 210 provides mapping between thermal state (air temperature, velocity and/or humidity) and HVAC output parameters (inlet velocity, inlet angle, inlet temperature, and/or inlet humidity), the airflow dynamics model 210 may determine current thermal state at the occupant's location based on the current output parameters. Further, the current thermal state is fed to the thermal comfort model 204 to estimate a target thermal state and the air flow dynamics model 210 is utilized to map the target thermal state with corresponding target outputs. Therefore, the air flow dynamics model 210 may provide two-way connection between the thermal comfort model 204 and the control policy 212. Further, the co-existence of the air flow dynamics model 210 and the thermal comfort model 204 ensures enhancement of accuracy of estimating the thermal comfort value of the occupant.

Thermal Comfort Model

Figure 3A:
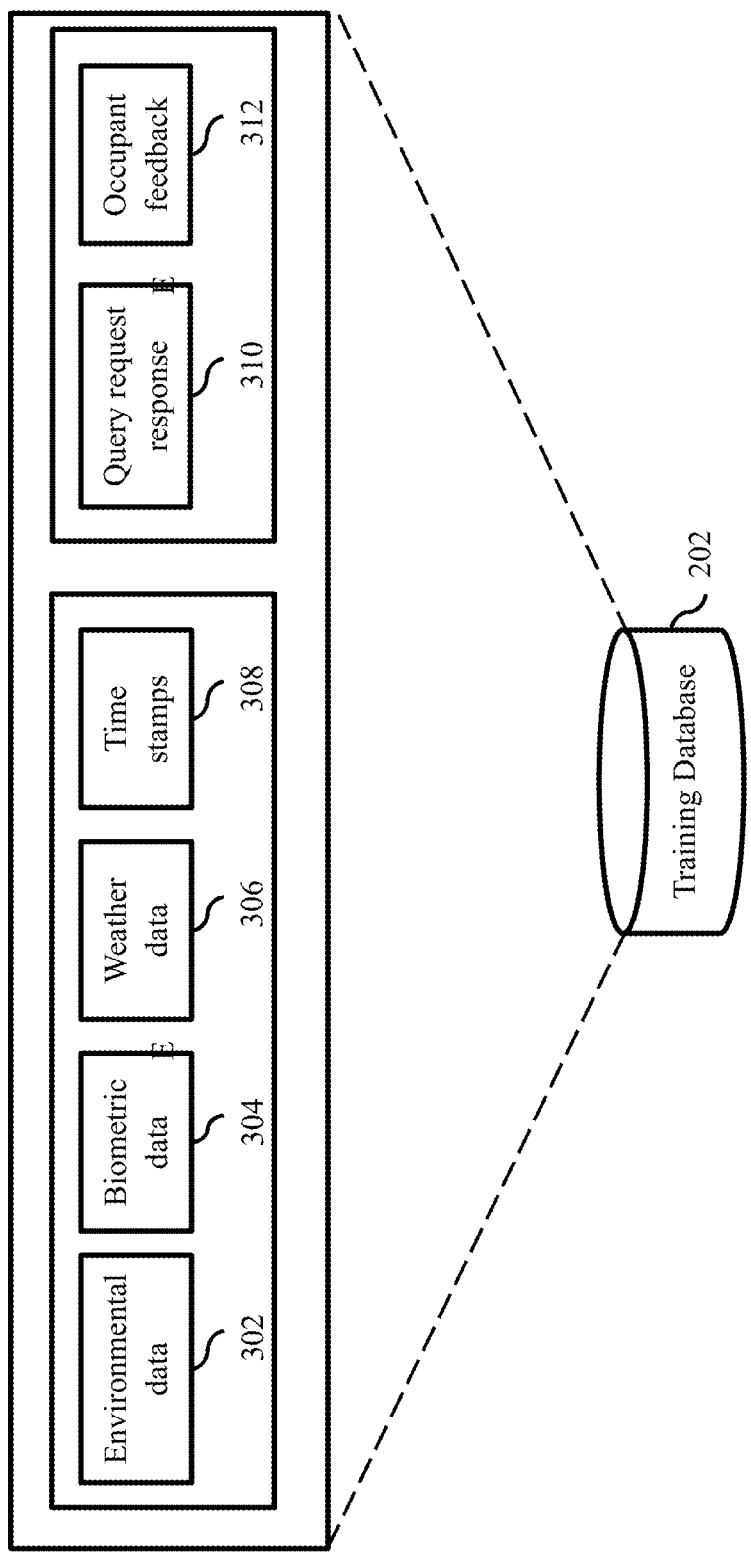
FIG. 3A shows a training database for training a personalized thermal comfort model, according to some embodiments.

FIG. 3A shows the training database 202 for training a personalized thermal comfort model, according to some embodiments. The training database 202 comprises one or combination of environmental data 302, biometric data 304, weather data 306, time stamps 308, query request response 310 and occupant feedback 312. The aforementioned data in the training database is pertinent to an occupant in the environment. Subsequently, the personalized thermal comfort model is established corresponding to the occupant based on the aforementioned data of the occupant in the training database 202. In some embodiments, the training database 202 may contain data of each of a plurality of occupants in the environment. Further, the data of each of the plurality of occupants may be utilized to establish respective personalized thermal comfort model and may be stored in the memory 106. The environmental data 302 is indicative of the current distribution of the thermal state in an environment. The biometric data 304 may also be referred to as the personal data and is indicative of a current thermal comfort of the occupant.

Figure 3B:
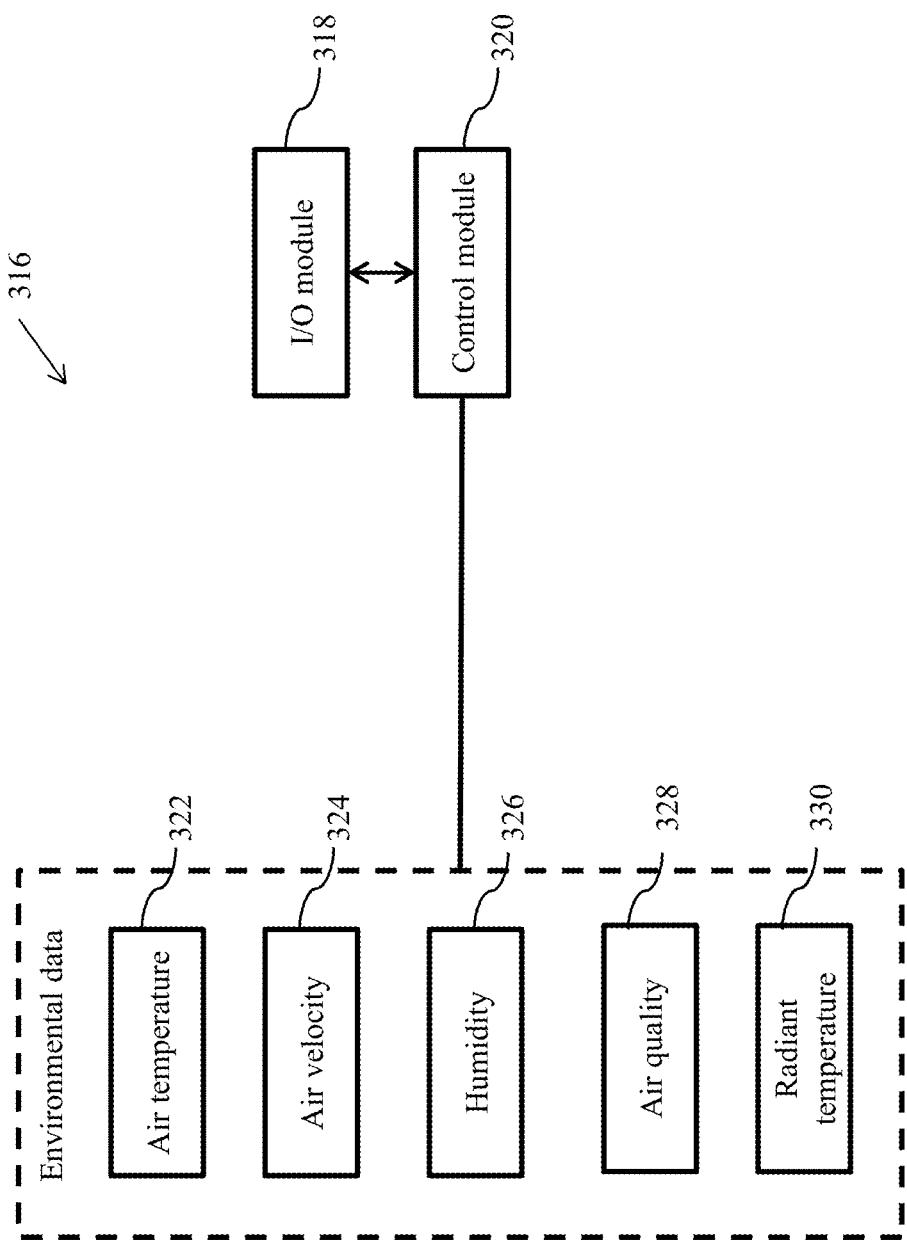
FIG. 3B shows various components of an environmental data sensing unit for acquiring environmental data, according to some embodiments.

Different sensing units are used for acquisition of the environmental data 302, biometric data 304 and the like. FIG. 3B shows various components of an environmental data sensing unit 316 for acquiring the environmental data 302, according to some embodiments. The environmental data sensing unit 316 may include an I/O module 318, which may include wireless communication components or an on-device user interface, a data processor or control module 320, a power supply which may be a removable or rechargeable battery, or a wireless power converter. The environmental data sensing unit 316 may include one or more sensors that measure various characteristics of the environment, such as air temperature 322, air velocity 324, humidity 326, air quality 328 and/or radiant temperature 330. Additionally, sensors such as, but not limited to, turbulence and $CO_2$ sensors are included in the environmental data sensing unit 316. The one or more sensors are located at the vicinity of the occupant. Although indicated as separate items, it is contemplated that a single sensor of the environmental data sensing unit 316 may measure more than one variable. For example, an omnidirectional anemometer may be used to measure air velocity 324 as well as turbulence intensity. In another example, the radiant temperature 330 may be determined based on data from an IR camera or by using a separate sensor, such as a glob thermometer. In some embodiments, the environmental data 302 may include a model of the environment and distributions of variables of the model of the environment. The model of the environment includes location of windows and location of doors and walls and the variables of the model of the environment indicate whether the windows and the doors are open or closed. Further, the model of the environment includes a location and a type of a heat source (computer, oven, occupants, etc.) in the environment and the variables of the model of the environment indicate a state of the heat source.

FIG. 3C shows various components of biometric data sensing unit 332 for acquiring the biometric data, according to some embodiments. The biometric data sensing unit 332 may include an I/O module 334, which can include wireless communication components or an on-device user interface, control module 336, a power supply which may be a removable or rechargeable battery. In some embodiments, both the environmental data sensing unit 316 and biometric data sensing unit 332 may include common I/O module, control/processor module and power supply.

The biometric data sensing unit 332 may include one or more sensors that measure heart rate 338, vital signs of the occupant 340, skin temperature 342, and/or skin conductance 344. The one or more sensors are located at the vicinity of the occupant. The heart rate 338 of the occupant may be measured by a heart rate monitor or a heart rate sensor. The heart rate sensor should have accuracy sufficient to differentiate between the LF band and the HF band. Further, based on the heart rate measurements, the processor module 336 may determine a ratio of low spectral frequency (LF) heart rate variability to high spectral frequency (HF) heart rate variability. A higher ratio of LF to HF corresponds to a higher level of discomfort for the occupant. The vital signs of occupant 340 may be obtained by utilizing a remote photoplethysmography (RPPG) sensor. In some embodiments, a wearable device may be used for measuring the vital signs of the occupant, wherein during an operation of the control system 100, the wearable device is in remote communication with the input interface of the control system. In some other embodiments, the obtaining of vital signs of occupant 340 may include capturing gestures of the occupant. An image sensor may be used to capture the gestures of the occupant.

The skin conductance 344 may be measured as the galvanic skin response reflecting the change in electrical properties of the occupant's skin associated with evaporative transfer from the occupant's skin. The skin temperature 342 may be used to quantify the heat transfer between the occupant and the environment. Each of the skin conductance and the skin temperature measurements may be compared to respective predefined ranges indicative of a particular occupant's, or a generalized user's preference. For example, the predefined ranges may be established based on feedback from the occupant during a setup of a comfort unit system or by manual intervention by the occupant during normal operation, or by any other means. In some embodiments, based on the LF/HF ratio and the comparison of the skin temperature 342 and the skin conductance 344 with the predefined ranges, a thermal comfort level of the occupant may be estimated. Alternatively, or additionally, the heart rate, the skin conductance, and the skin temperature measurements can be combined into a metric indicative of the thermal comfort level of the occupant. The biometric data sensing unit 332 may include an IR camera that outputs IR image of the occupant. Analysis of the IR image may provide an estimate of clothing level by comparing temperature of the outer most layer of clothing to the skin temperature 342 of the occupant. In some embodiments, the determined clothing level may be utilized in determination of the thermal comfort level of the occupant.

To obtain the biometric data 304, the one or more sensors of the biometric data sensing unit 332 may be in direct contact with the skin of the occupant. For example, the sensing unit 332, or portions thereof, may be a wearable device, such as a watch, bracelet, necklace, shoe insert, or arm band. In some embodiments, the sensing unit 332, or portions thereof, may be a standalone device that an occupant intermittently operates. In some other embodiments, the sensing unit 332, or portions thereof, may be integrated with a heating ventilation and air conditioning (HVAC) system. Further, other configurations may also possible according to one or more contemplated embodiments.

The weather data 306 in the training database 202 may be obtained from a meteorological agency 203 such as national weather service in the USA. The weather data 306 provides a statistical relationship between the occupant's preferences and the season, type of weather, and the like. Each of the data acquired and stored in the training database 202 is associated with time stamps 308. The time stamps 308 may include one or more of time, date, season or combination thereof.

Further, the training database may include user or occupant feedback 312. The occupant feedback may be verbal, written, physiological, or visual. Examples of physiological feedback include shivering of an occupant indicating that the occupant is experiencing cold. Examples of verbal feedback may be explicit labels provided by the occupant such as 'too hot' or 'too cold'. In some embodiments, the occupant is queried to receive the feedback. In such instances, query request functionality is initiated to obtain query request response 310.

Figure 3D:
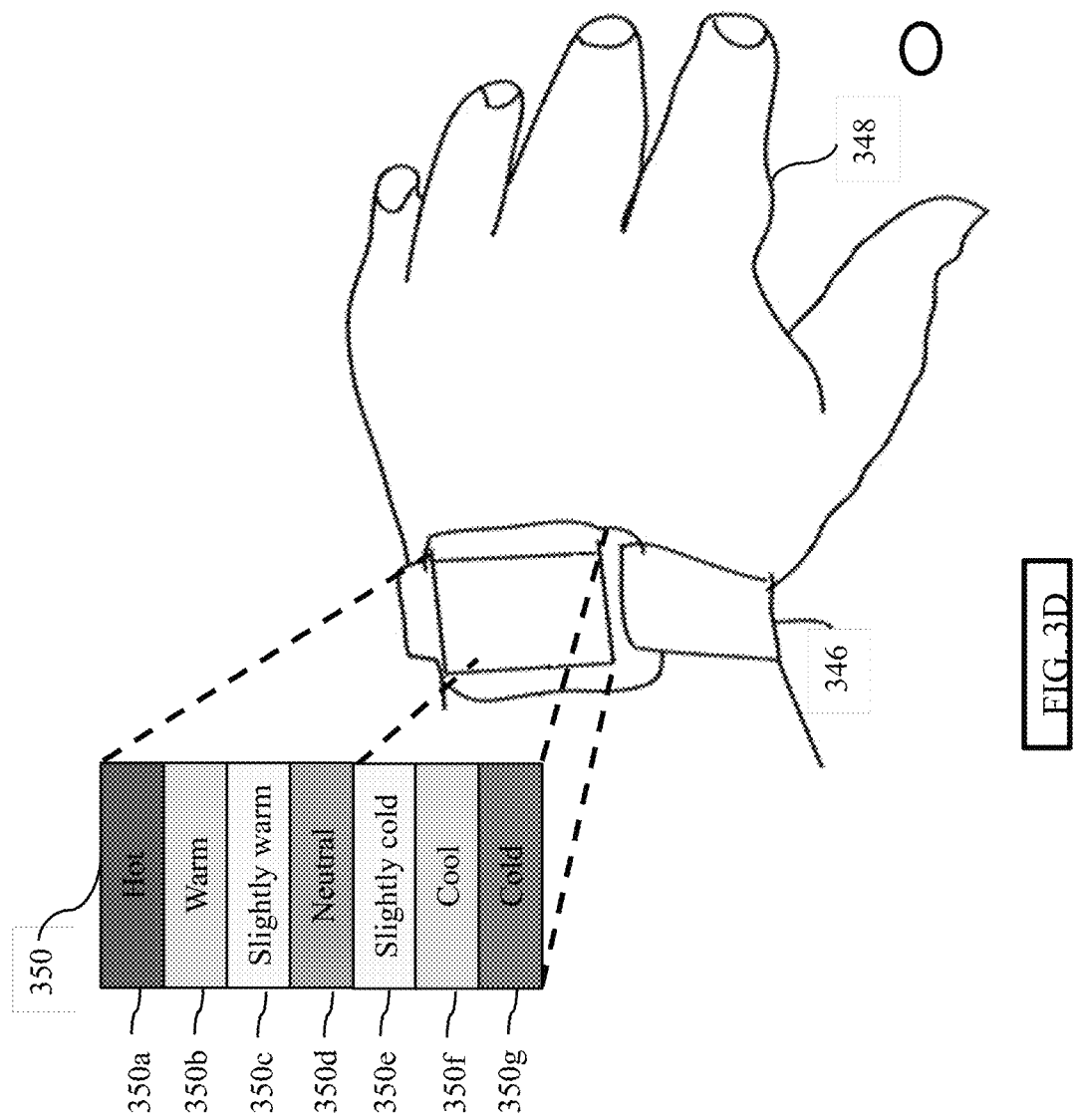
FIG. 3D illustrates an exemplary feedback mechanism provided to occupant to obtain occupant's feedback, according to some embodiments.

FIG. 3D illustrates an example feedback mechanism provided to the occupant to obtain occupant feedback 312, according to some embodiments. A wearable device 346 may be disposed on wrist of occupant 348. The wearable device 346 is configured to display a list 350 that comprises seven levels of thermal comfort 350a to 350g as per thermal sensation scale (ASHRAE® scale i.e., American Society of Heating, Refrigerating and Air-Conditioning Engineers) or thermal comfort scale (Bedford scale). The wearable device 346 facilitates the occupant to select a thermal comfort level from the seven levels of thermal comfort 350a to 350g. The selected thermal comfort level is the occupant feedback 312 and is stored in the training database 202 Alternate examples of feedback mechanism may include vision-based methods, motion-based methods and/or stance-based methods. The vision-based methods may include analysing camera images of the occupant for thermal flow from the body, motions of the occupant, expressions of the occupant, and the like. The motion-based methods may include tracking the motions of the occupants to determine the occupant's state of comfort. The stance-based methods may include determining if the occupant is sitting or standing in response to the environment. To this end, the environmental data 302, the biometric data 304, the weather data 306, the time stamps 308, the query request response 310 and the occupant feedback 312 may be acquired and stored in the training database 202. As the acquisition of the aforementioned data and storing in the training database 202 is carried out in advance, the data in the training database 202 may be referred to as historical data.

FIG. 4 shows a schematic of the learning process of the thermal comfort model, according to some embodiments. In the offline stage, the historical data in the training database 400 is utilized to establish a thermal circuit model 402. The thermal circuit model 402 at this stage may be referred to as an initial model. The initial model may estimate a thermal comfort value of the occupant. After the initial model is learned based on the historical data, there are two modes of function. The first mode is continuous prediction of the thermal value comfort of the occupant and occurs at each time instant at which data is acquired and stored in the training database. The second mode is the thermal comfort model update mode and occurs when the occupant provides a feedback. In some embodiments, the feedback may be voluntarily given on being queried i.e. query request response 310 or the occupant feedback 312. In the thermal comfort model update mode, in the event when feedback is received, the thermal comfort model 402 is updated 404 in accordance with the received feedback. The thermal comfort model 402 provides boundary condition to the airflow dynamics model.

In the online stage, the occupant is located in the environment and real-time data is received. The real-time data may include current distribution of a thermal state in the environment and/or real-time biometric data of the occupant 406. The occupant may provide a comfort level of the occupant in different environmental conditions via a feedback mechanism like, for example, a wearable device 346. The comfort levels of the occupant may include a cold comfort range of about 59° F. to 65° F. and below, a cool comfort range of about 61° F. to 67° F. and below, a comfortable comfort range of about 68° F. to 72° F. or 65° F. to 74° F., a warm comfort range of about 70° F. to 75° F. and above or 72° F. to 77° F. and above, and a hot comfort range of about 73° F. to 75° F. and above or a range of about 74° F. to 80° F. and above. The aforementioned temperature ranges may be exclusive to the occupant which implies that the temperature ranges may vary from one occupant to another. In some embodiments, the temperature ranges variation from one occupant to another depends upon the data stored in the training database to establish the thermal comfort model 402.

Additionally, or alternatively, some embodiments are based on recognition that the current thermal state at the location of the occupant determined using the ADM and the current thermal comfort of the occupant can be used not only to control HVAC system, but also to update the TCM for further use. This is advantageous because the ADM can provide multi-value estimation of the thermal state at the location of the occupant without using additional sensors. To that end, in some embodiments, the processor is further configured to update the TCM based on the current thermal state at the location of the occupant determined using the ADM and the current thermal comfort of the occupant.

Some embodiments are based on a realization that in the event the thermal circuit model 402 requires a feedback from the occupant, transfer learning may be used to reduce number of instances required. The transfer learning is a type of machine learning, where knowledge from one domain is transferred to another with a goal of facilitating learning. Some embodiments are based on the realization that domains refer to different users or occupants, specifically source domain would pertain to data from N-1 occupants whose data is concurrently collected or has been collected in the past, and target domain would refer to data from the $N^{th}$ occupant, or the occupant whose thermal comfort model need to be established. In the cases, in which the domains of data are described in the above manner, and feedback is available in both source and target domains, a transfer learning approach may be contemplated herein as an inductive transfer learning approach. By way of non-limiting example, at least one approach to inductive transfer learning may be parameter transfer, where the assumption is that parameters for individual thermal comfort models for similar tasks should be sampled from the same prior distribution, or like prior distribution.

Further, the occupant's feedback is contemplated as labeled data and stored in the training database. Subsequently, the thermal comfort model is relearned and updated 410. The thermal comfort model 402 provides updated boundary condition based on the updated thermal comfort model 412. In some embodiments, the thermal comfort model 402 provides updated boundary condition to the airflow dynamics model, at each instant the thermal comfort model is fed with an occupant's feedback.

The air flow dynamics model may be a physical model describing dynamics of the airflow velocity, temperature, and humidity in the environment. This air flow dynamics model is based on conservation of mass, momentum and energy of the heated or cooled air in the environment. The mathematical representation of this model may be in a form of partial differential equations (PDEs) whose boundary conditions are determined based on the thermal comfort model. The outcome of the air flow dynamics model is the airflow velocity, temperature and humidity in the environment, including around the occupant. In some embodiments, the air flow dynamics model may be calibrated in advance.

Figure 5:
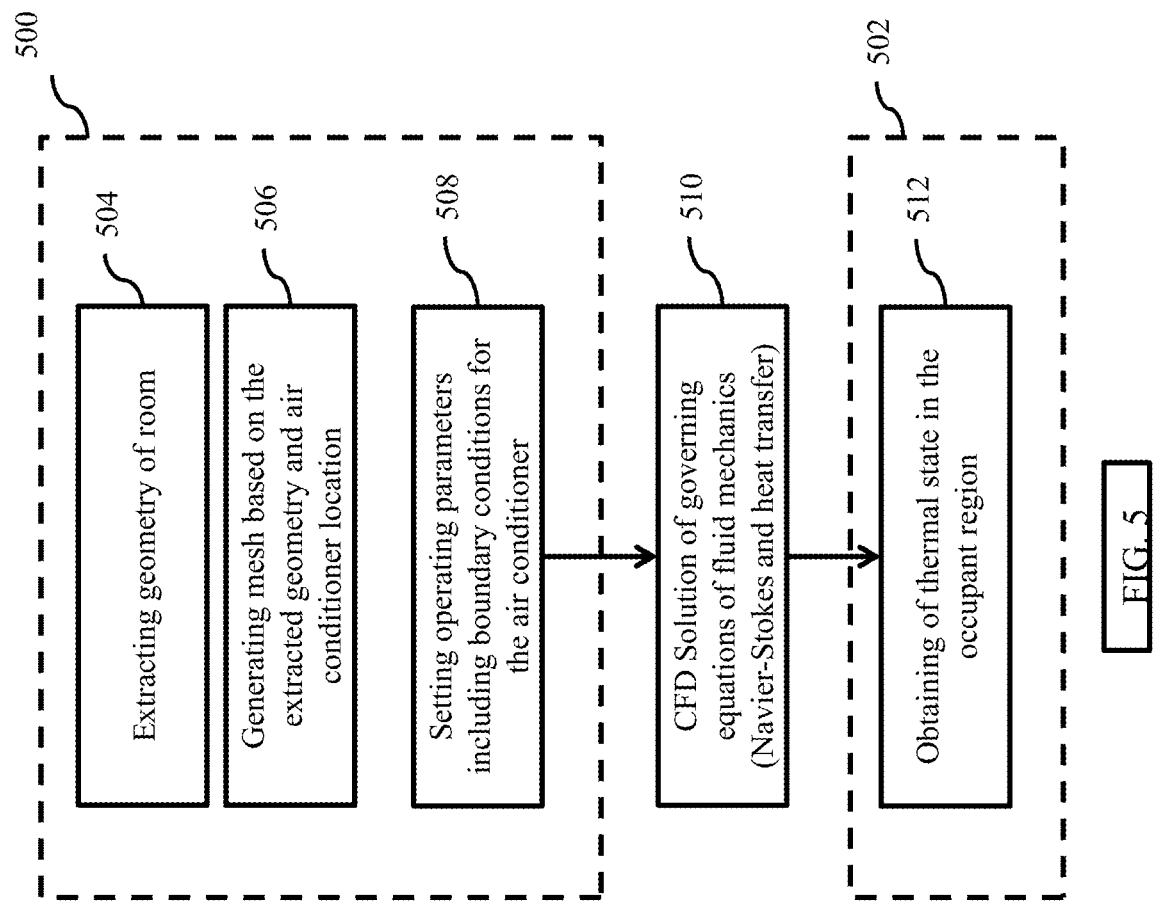
FIG. 5 shows a schematic of preprocessing and post processing involved in computational fluid dynamics (CFD) simulations to obtain thermal state at occupant's location, according to some embodiments.

FIG. 5 shows a schematic of preprocessing 500 and post processing 502 involved in computational fluid dynamics (CFD) simulations to obtain thermal state at the occupant location, according to some embodiments. The CFD is a branch of fluid mechanics that uses numerical analysis and data structures to solve and analyze equations related to fluid flows. A mathematical model of the physical case and a numerical method are used in a software tool, such as the CFD, to analyse the fluid flow. For instance, the Navier-Stokes equations are specified as the mathematical model of the physical case. This describes changes on physical properties for both fluid flow and heat transfer. Here the fluid may be air. The mathematical model varies in accordance with the content of the problem such as heat transfer, mass transfer, phase change, chemical reaction, and the like. Here a room is referred to the environment in which the occupant is located. The preprocessing 500 step comprises defining geometry and physical bounds of problem using computer aided design (CAD) and consequently extracting geometry of the room 504. Further, a mesh may be generated based on the extracted geometry 506 and operating parameters including boundary conditions may be set for air conditioner 508. The air conditioner may correspond to the HVAC system. The post processing 502 includes obtaining the thermal state at the occupant's location 512 based on the preprocessing step 500 and CFD solution of governing equations of fluid mechanics 510.

In some embodiments, the geometry may be architecture of the room and may, for example, be extracted from blueprints of the building of the room. Further, volume occupied by fluid in the room is determined. Post extracting the geometry of the room, the mesh is generated based on the extracted geometry and the air conditioner location 506. In some embodiments, the extracted geometry is divided into discrete cells (i.e. the mesh).

The mesh may be uniform or non-uniform, structured or unstructured, consisting of a combination of hexahedral, tetrahedral, prismatic, pyramidal or polyhedral elements. The optimal number of mesh points in the domain is selected such that the important flow structures, e.g. circulations in the room, buoyant ascending or descending flow structure in vicinity of the air conditioner or occupant, etc. are captured in the mesh with high resolution. For example, the mesh points around the inlet can be increased to better capture the dynamics of high velocity in vicinity of the inlet. Other examples include increasing the number of elements in vicinity of heat loads, occupants or outlet. An optimal mesh is obtained by mesh sensitivity analysis. To perform mesh sensitivity analysis, systematically increase the number of nodes, say by doubling the number elements is needed. For each mesh, a value of interest is monitored. The optimal mesh is the one after which by increasing the number of mesh points the value of interest does not alter. For architectural fluid mechanics applications, such values of interest could be the average of temperature in the target region, heat transfer through the wall, average temperature at the outlet, etc.

Further, in the preprocessing 500, other physical information required for CFD simulation and optimization are estimated by setting the operating parameters including boundary conditions for the air conditioner 508. This includes specifying fluid behavior and properties at all bounding surfaces of the room. Nominal conditions of the air conditioner may be used as the initial values for the air conditioner input in a form of boundary conditions. A boundary condition of a field (for example velocity, pressure) specifies the value of the function itself, or the value of the normal derivative of the function, or the form of a curve or surface that gives a value to the normal derivative and the variable itself, or a relationship between the value of the function and the derivatives of the function at a given area. The boundary conditions for velocity at solid surfaces such as walls are set to zero. The boundary conditions for temperature are based on the heat transfer between the room and its exterior. Such heat transfer depends on the thermophysical properties of walls of the room, e.g. conductivity of various layers used in the building envelope, thickness of each layer, and the exterior air temperature. The thermo-physical properties of the fluid within the room, e.g. the density or thermal diffusivity, may be chosen based on appropriate thermal state model.

Further, computation fluid dynamics (CFD) may solve the governing equations of mechanics of the fluid 510. Here, the governing equations are Navier-Stokes equations. The CFD solves the Navier-Stokes equation along with mass and energy conservation. The set of equations, based on the Navier-Stokes equation, are proved to represent the mechanical behavior of a Newtonian fluid, such as air, and are implemented for simulations of flows within the environment or the room. Discretization of the Navier-Stokes equations is a reformulation of the equations in such a way that the Navier-Stokes equations may be applied to computational fluid dynamics. The governing equations, Navier-Stokes with heat transfer, are as follows:

$$\frac{\partial V}{\partial t} + V.\nabla V + \frac{1}{\rho}\nabla p - \nabla.(\nu\nabla V) = g\beta\Delta T \quad (1a)$$

$$\nabla.V = 0 \quad (1b)$$

$$\frac{\partial T}{\partial t} + V.\nabla T - \nabla.(\kappa\nabla T) = 0 \quad (1c)$$

where,
$\nabla.$ is divergence operator,
$\nabla$ is gradient operator, and
$\nabla^2$ is Laplacian operator.
p, V, T are pressure, velocity and temperature distribution respectively.

Further, equations such as relative humidity $\psi$ can also be coupled to above equations.

The equations 1a-1c may be denoted as N (p, V, T, $\psi$)=0 and computation fluid dynamics (CFD) may be utilized to solve the equations 1a-1c to obtain the solution.

In the post-processing 502, from the solution of the equations 1a-1c, obtained by the CFD 510, the thermal state at the occupant location is obtained. Such thermal state includes the temperature, air velocity and humidity of air/fluid in the occupant's location. Further, the obtained thermal state may be used to evaluate thermal comfort of the occupant, and subsequently, boundary conditions for the air flow dynamics model is modified to improve the thermal comfort of the occupant and minimize energy consumption of the air conditioner.

Figure 6:
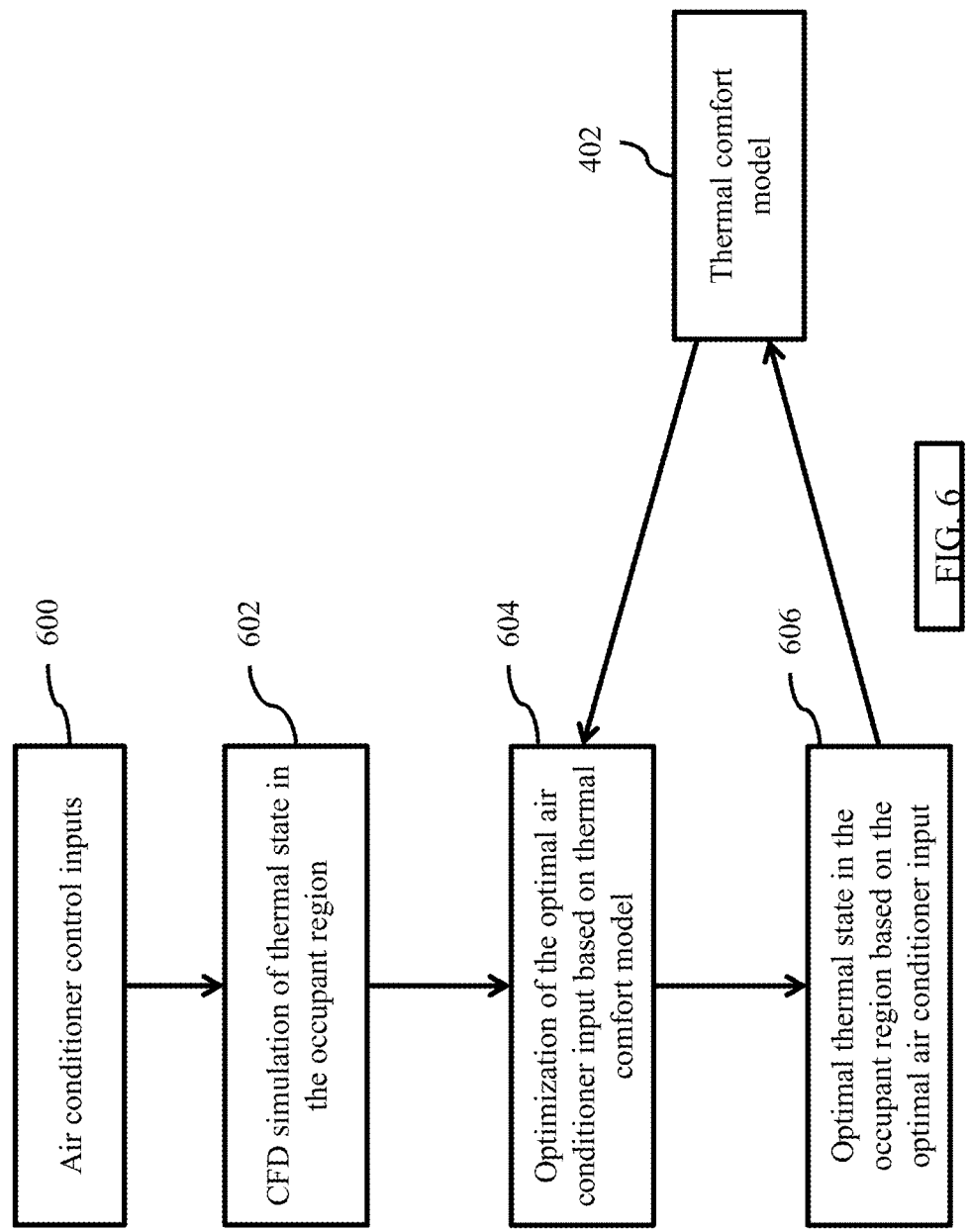
FIG. 6 shows a schematic for obtaining thermal state at the occupant's location based on CFD simulation and optimal air conditioner input, according to some embodiments.

FIG. 6 shows a schematic for obtaining the thermal state at the occupant's region based on CFD simulation and optimal air conditioner input, according to some embodiments. Air conditioner control inputs 600 are, for example, the inlet temperature and velocity, the angle of the flow direction, the humidity of the air conditioner flow, and the like. In some embodiments, the air conditioner control inputs 600 are utilized as boundary conditions for the CFD simulations 602. The CFD simulation may yield the thermal state at the location of the occupant 602 (as described with reference to FIG. 5). The thermal state may include the air velocity, temperature and humidity distribution at the occupant's location.

Further, the air conditioner inputs 600 are optimized. The optimization of air conditioner input 604 is based on the thermal comfort of the occupant, which relies on the thermal comfort model 402. In some embodiments, the optimization of air conditioner input 604 is based on both the thermal comfort model and the thermal state at the occupant's location from the CFD simulation 602. In some embodiments, the optimization may be dependent on the energy consumption. Therefore, an optimal air conditioner input is one which provides the highest thermal comfort at the occupant's location with the minimal energy consumption of the air conditioner. Succeeding the CFD simulation 602 and the optimization of air conditioner input 604, optimal thermal state at the location of the occupant is determined 606. The optimal thermal state at the location of the occupant is determined based on the optimal values of air conditioner inputs obtained from the optimization 604. In some embodiments, the optimal thermal state is stored in the training database 202 and utilized in the thermal comfort model 402 for the training intent.

Some embodiments are based on a realization that in the event the CFD is used for the purpose of obtaining the thermal state in the occupant location, a particular cost function needs to be minimized to obtain most comfortable thermal state for the occupant with the minimal energy consumption.

Figure 7:
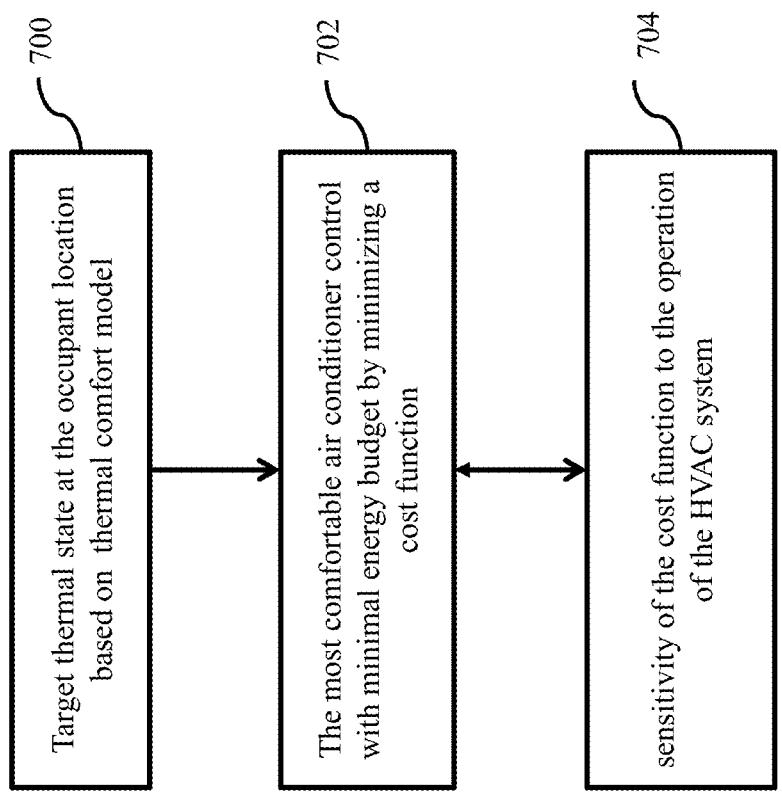
FIG. 7 shows a schematic of minimizing a cost function to obtain comfortable thermal state in the occupant region while improving energy efficiency of HVAC system according to some embodiments.

FIG. 7 shows a schematic of minimizing a cost function to obtain comfortable thermal state in the occupant region while improving energy efficiency of HVAC system according to some embodiments. That target thermal state at the location of the occupant is estimated based on thermal comfort model 700. Some embodiments are based on realization that there are a number of different combination of outputs of the HVAC system that can lead to satisfaction of the target thermal state. To that end, some embodiments aim to find not just any suitable output combination but the one that minimizes energy consumption of the HVAC system. That is, among all output combination that can meet the estimated target thermal state, the embodiments select one that require minimum energy to implement. In some embodiments, this output combination is solved using an optimization of a cost function 702. For example, in one embodiment, the cost function utilizes the thermal state resulted by the thermal comfort model 702, and minimized based on aim of improving the estimate thermal comfort of the occupant in the occupant region with minimum energy consumption of the device. For example, the optimization of the cost function can be performed iteratively 704 based on a sensitivity of the cost function to the operation of the HVAC system an exemplar sensitivity based optimization is a direct-adjoint-looping (DAL) method.

Some embodiments are based on realization that the cost function, described with reference to the FIG. 7 is based on well-mixed thermal state model in the room, which assumes the entire domain constitutes of a single temperature value. Such realization in many cases is incorrect and over-simplified since thermal stratification is common in buildings. Buildings are complex, multi-scale in time and space, multi-physics and highly uncertain dynamic systems with wide varieties of disturbances. In the CFD analysis, the whole building is considered as an integrated system and the airflow dynamics are simulated efficiently.

Specifically, some embodiments are based on a realization that thermal state in the room affects the thermal comfort of the occupant at the occupant region as well the energy consumption of the air conditioner. FIG. 8A shows a schematic of constructing and evaluating a cost function that includes both thermal comfort of the occupant and energy consumption of the HVAC system, according to some embodiments. The thermal state of the occupant based on thermal comfort model 800 is obtained. Further, thermal state based on the CFD simulation 802 is obtained. The cost function 806 evaluation yields a numerical value representing how well the CFD simulation thermal state 802 matches with the thermal state based on thermal comfort model 800 along the line of sight of different beams at various altitudes. Multiple thermal states may have similar thermal comfort states in the occupant region. However, such thermal states may have different energy budget when the energy consumption of air conditioner based on refrigerant cycle model 804 is considered.

Figure 8B:
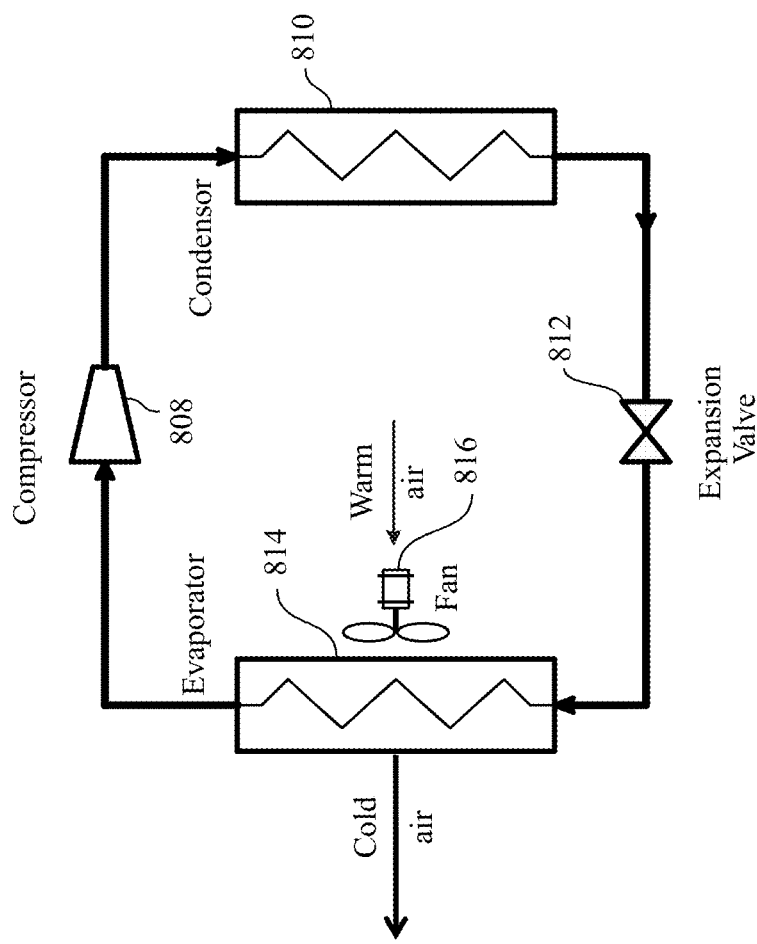
FIG. 8B shows a schematic of a vapor-compression cycle as an exemplar of the refrigerant cycle, according to some embodiments.

For example, in some embodiments, thermal comfort model may be optimized but with large values of fan speed in the refrigerant cycle. FIG. 8B shows a schematic of a vapor-compression cycle as an exemplar of the refrigerant cycle, according to some embodiments. Refrigeration cycles are the conceptual and mathematical models for heat pumps and refrigerators. An example of refrigerant cycle is vapor-compression cycle, which is used in most household refrigerators as well as in many large commercial and industrial refrigeration systems, with refrigerant as working fluid. A refrigerant is a substance or mixture, usually a fluid such as fluorocarbons that undergoes phase transitions from a liquid to a gas and back again in the vapor-compression cycle. The vapor-compression utilizes circulating liquid the refrigerant as the medium which absorbs and removes heat from the room to be cooled and subsequently rejects that heat elsewhere. All such systems have four components: a compressor 808, a condenser 810, a thermal expansion valve (also called a throttle valve or metering device) 812, and an evaporator 814. Also, a fan 816 circulates the warm air in enclosed space across the coil or tubes carrying the cold refrigerant liquid and vapor mixture. As a result of this, energy consumption is associated with the compressor 808, the condenser 810, the thermal expansion valve 812, and the evaporator 814. The evaluation of cost function 806 may consider such energy consumption in addition to the thermal comfort of the occupant in the occupant location.

The cost function J is defined as $$J = \iiiint_\Omega (T-T_{comf})^2 + (V-V_{comf})^2 + (\psi-\psi_{comf})^2 dx dy dz dt \quad i \quad (2)$$

where, $T_{comf}$, $V_{comf}$, $\psi_{comf}$ are determined from the thermal comfort model, which itself, uses T, V, ψ of the thermal state for the training purpose. Here Ω is the region of the interest.

FIG. 9 shows a block diagram as an exemplary optimization method to implement the optimal air conditioner input in terms of the thermal comfort of the occupant with minimum energy, according to some embodiments. Initial value of the air conditioner 900, which are served as boundary conditions for Navier-Stokes equations with heat transfer, are based on the nominal operating conditions of the refrigerant cycle. The initial value of the air conditioner 900 is utilized for CFD solution of governing equations 902. Further, CFD solution of adjoint equations 904 is determined. The CFD solution of adjoint equations 904 is utilized to evaluate sensitivity of cost function 906. The adjoint Navier-Stokes and heat transfer problem is derived on the level of partial differential equations (PDE) first, based on Euler-Lagrange method to enforce the ADM. The aim is to minimize the cost function in presence of ADM or any other suitable constraints. Other constraints may be geometry of the room, the maximum velocity that can be provided by HVAC, the minimum or maximum temperature that can be provided by HVAC, etc. In deriving the adjoint equations the frozen-turbulence assumption can be used, which neglects the variations of the turbulence field with respect to the cost function in the analysis. Second, likewise to regular CFD problems, the PDE equations are discretized in the computational domain with various numerical methods e.g. finite volume, finite element, finite difference, etc.

The sensitivity of cost function 906 is deemed as gradient of cost function. Further, gradient descent method is applied to update operating parameters for the air conditioner 908. A convergence criterion is checked 910. An example of such convergence criterion is the variation of the cost function between successive iterations. Another example is the magnitude if the sensitivity or gradient of the cost function with respect to design variables. If the convergence criterion is not met, then next iteration is instigated in which CFD solution of governing equations 902 is determined. The convergence criterion is satisfied in the event that the thermal state in the occupant region is equal or approximately equal to the thermal state required by the thermal comfort model. In the event, the convergence criterion is satisfied, final estimation of operating parameters 914 for the air conditioner is carried out.

The sensitivity of cost function with respect to any operating parameter $\xi_i$ may be expressed as:

$$\frac{\delta J}{\delta \xi_i} = \frac{J(\xi_i + \delta\xi_i, \xi_1, \ldots, \xi_{i-1}, \xi_{i+1}, \ldots) - J(\xi_i - \delta\xi_i, \xi_1, \ldots, \xi_{i-1}, \xi_{i+1}, \ldots)}{2\delta\xi_i} \quad (3)$$

The set of operating parameters that needs to be estimated are denoted by $(\xi_1, \xi_2, \ldots \xi_n)$. Optiimization method uses an augmented objective function L as $$L = J + \int_\Omega (p_a, V_a, T_a, \psi_a) N(p, V, T, \psi) d\Omega \quad (4)$$

N(p, V, T, ψ)=0 are Navier-Stokes equations with heat transfer, and mass conservation.

Considering the variation of $\xi_i$, the variation of L can be expressed as $$\delta L = \frac{\delta L}{\delta \xi_i} d\xi_i + \frac{\delta L}{\delta V} dV + \frac{\delta L}{\delta p} dp \quad (5)$$

To determine $$\frac{\delta L}{\delta \xi_i},$$

the adjoint variables are chosen to satisfy the condition below:

$$\frac{\delta L}{\delta V} \delta V + \frac{\delta L}{\delta p} \delta p = 0.$$

Hence, Direct-Adjoint-Looping (DAL) method involves Lagrangian multipliers ($V_a$, $p_a$, $T_a$), which stands for adjoint velocity, and pressure, respectively, to make ∂ J/∂ $\xi_i$ computable. The air conditioner input to be determined by the optimization are chosen to be V, T, ψ, i.e. the inlet velocity, inlet angle, inlet temperature, and inlet humidity.

For example, to determine δ J/δ V and δ J/δ T, optimization approach may be used by setting $\xi_i$=V or $\xi_i$=T. Also, ($p_a$, $V_a$, $\psi_a$) are the adjoint pressure, velocity, temperature and humidity used in step 904. The adjoint variables may be regarded as purely mathematical terms. In some embodiments, the adjoint variables provide or signify the influence of an arbitrary source term on the functional of interest i.e., the Navier-Stokes equations with heat transfer.

The adjoint variables may be used to determine the sensitivity of cost function to any operating parameter $\xi_i$ $$\frac{\delta L}{\delta \xi_i} = \frac{\delta J}{\delta \xi_i} + \int_\Omega (p_a, V_a, T_a, \psi_a) \frac{\delta N(p, V, T_a, \psi_a)}{\delta \xi_i} d\Omega \quad (6)$$

By using simple steepest descent algorithm, $\xi_i$ may be updated as $$\xi_i^{new} = \xi_i^{old} - \lambda \frac{\delta J}{\delta \xi_i} \quad (7)$$

where $\lambda$ is a positive constant representing the step size.

Figure 10:
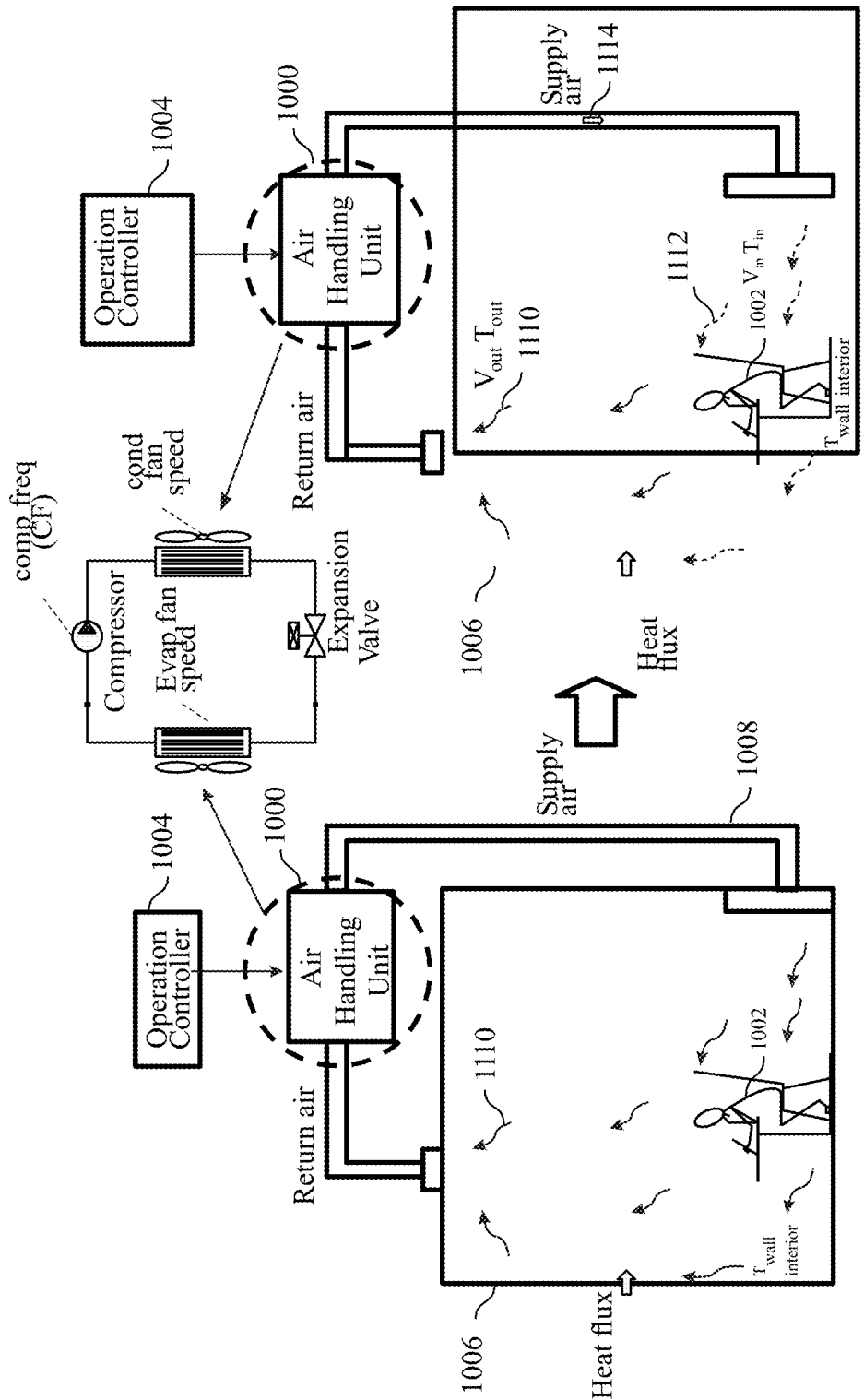
FIG. 10 illustrates controlling an HVAC system to achieve thermal comfort of an occupant using a control system, according to some embodiments.

FIG. 10 illustrates controlling an air handling unit 1000 to achieve thermal comfort of an occupant 1002 using a control system, according to some embodiments. The control system may include an operation controller 1004 and occupant feedback. In these embodiments, operation of the air handling unit 1000 is based on control commands determined by operation controller 1004 according to various embodiments based on thermal comfort model and current thermal comfort of the occupant 1002.

Arrows 1110 around the occupant 1002 represent current room conditions 1008 such as air velocity, temperature and humidity in the environment. The occupant 1002, in the environment 1006, may experience these environmental variables and as a result the feedback may be hot, cold, or comfortable to varying degrees. The occupant feedback may be indicative of current thermal comfort of the occupant 1002. Alternatively, in some embodiments, the occupant 1002 may express discomfort through motions, sitting position, facial and/or expressions and biometric sensors may capture these to provide the current thermal comfort of the occupant 1002.

The operation controller 1006 provides control commands to the air handling unit 1000 to change air velocity, temperature and humidity at the occupant location 1114, such that it achieves comfortable thermal conditions at the occupants location. Consequently, the room conditions are updated and include uneven distribution of room conditions (1110, 1112).

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, if understood by one of ordinary skill in the art, the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A control system for controlling a heating ventilation and air conditioning (HVAC) system to condition an environment, comprising:
    an input interface configured to accept an input thermal state at a location of an occupant in the environment;
    a processor configured to
        determine a target thermal state at a set of air vents connecting the HVAC system to the environment, such that the target thermal state at the air vents results in the input thermal state at the location of the occupant according to an airflow dynamics model (ADM) connecting uneven distribution of thermal states at different locations in the environment, wherein the processor determines the target thermal state at the air vents based on computational fluid dynamics (CFD) calculation of dynamics of air in the environment using the ADM as a constraint, and the input thermal state at the location of the occupant and the target thermal state at the air vents as boundary conditions on the distribution of thermal states in the environment, wherein the ADM represents spatio-temporal dynamics of the air using partial differential equations (PDEs), such that the CFD calculation solves the PDEs to produce the target thermal state at the air vents; and determine control commands to one or multiple actuators of the HVAC system producing the target thermal state at the air vents by optimizing a cost function using an HVAC model connecting thermal states at the air vents with states of the actuators of the HVAC system without relying on thermal state at different locations in the environment; and a control interface configured to submit the control commands to the actuators of the HVAC system.

2. The control system of claim 1, wherein the PDEs includes Navier-Stokes equations with heat transfer equations describing changes on physical properties of heat transfer and motion of the air, wherein, to solve the PDEs, the CFD calculation solves the Navier-Stokes equations with heat transfer equations to produce the target thermal state at the air vents resulting in the input thermal state at the location of the occupant.

3. The control system of claim 1, wherein the optimization of the cost function minimizes energy consumption of the HVAC system.

4. The control system of claim 1, wherein the optimization of the cost function is performed iteratively based on a sensitivity of the cost function to the operation of the HVAC system.

5. The control system of claim 4, wherein the cost function is optimized using a direct-adjoint-looping (DAL) method.

6. The control system of claim 1, wherein the thermal state at each location in the environment includes a temperature vector and an airflow velocity vector, such that the distribution of values of thermal states at different locations in the environment includes distributions of the temperature field and distributions of the airflow field.

7. The control system of claim 1, wherein the thermal state at each location in the environment includes a temperature vector, an airflow velocity vector, and a humidity vector, such that the distribution of values of thermal states at different locations in the environment includes distributions of the temperature field, distributions of the airflow field, and distributions of the humidity field.

8. The control system of claim 1, further comprising:
a memory configured to
store a thermal comfort model (TCM) connecting a current thermal state at the location of the occupant with the input thermal state at the location of the occupant changing a current thermal comfort of the occupant to a desired thermal comfort;
store the ADM; and
store the HVAC model connecting thermal states at the air vents with states of the actuators of the HVAC system;
wherein the input interface is configured to accept data indicative of the current thermal comfort of the occupant;
wherein the processor configured to
estimate the current thermal state at the location of the occupant using the ADM model with boundary conditions determined by a current thermal state at the air vents;
submit the current thermal state at the location of the occupant and the current thermal comfort of the occupant to the TCM to produce the input thermal state at the location of the occupant;
determine the target thermal state at the air vents resulting in the input thermal state at the location of the occupant according to the ADM; and
determine the control commands updating the states of the actuator to result in the target thermal state at the air vents according to the HVAC model.

9. The control system of claim 8, wherein the processor is configured to determine current thermal state at the air vent using the HVAC model with current states of the actuators of the HVAC system.

10. The control system of claim 8, further comprising a biometric sensor configured to determine the current thermal comfort of the occupant based on biometrics of the occupant.

11. The control system of claim 10, wherein the biometric sensor includes one or combination of a remote photoplethysmography (RPPG) sensor for measuring one or more vital signs of the occupant, a wearable device for measuring the one or more vital signs of the occupants, and a camera for determining gestures of the occupant indicative of the thermal comfort of the occupant.

12. The control system of claim 8, wherein the input interface is configured to receive labels of the current thermal comfort provided by the occupant.

13. The control system of claim 8, wherein the processor is further configured to update the TCM based on the current thermal state at the location of the occupant determined using the ADM and the current thermal comfort of the occupant.

14. A method for controlling a heating ventilation and air conditioning (HVAC) system to condition an environment, comprising:
accepting an input thermal state at a location of an occupant in the environment;
determining, by a processor, a target thermal state at a set of air vents connecting the HVAC system to the environment, such that the target thermal state at the air vents results in the input thermal state at the location of the occupant according to an airflow dynamics model (ADM) connecting uneven distribution of thermal states at different locations in the environment, wherein the target thermal state at the air vents are determined based on computational fluid dynamics (CFD) calculation of dynamics of air in the environment using the ADM as a constraint, and the input thermal state at the location of the occupant and the target thermal state at the air vents as boundary conditions on the distribution of thermal states in the environment, wherein the ADM represents spatio-temporal dynamics of the air using partial differential equations (PDEs), such that the CFD calculation solves the PDEs to produce the target thermal state at the air vents; and determining, by the processor, control commands to one or multiple actuators of the HVAC system producing the target thermal state at the air vents by optimizing a cost function using an HVAC model connecting thermal states at the air vents with states of the actuators of the HVAC system without relying on thermal state at different locations in the environment; and submitting the control commands to the actuators of the HVAC system.

15. The method of claim 14, wherein the PDEs includes Navier-Stokes equations with heat transfer equations describing changes on physical properties of heat transfer and motion of the air, wherein, to solve the PDEs, the CFD calculation solves the Navier-Stokes equations with heat transfer equations to produce the target thermal state at the air vents resulting in the input thermal state at the location of the occupant.

16. The method of claim 14, wherein the optimization of the cost function minimizes energy consumption of the HVAC system.

* * * * *